(12) United States Patent
Peng et al.

(10) Patent No.: US 11,153,035 B2
(45) Date of Patent: Oct. 19, 2021

(54) SCHEDULING METHOD AND RELATED APPARATUS

(71) Applicant: Huawei Technologies Co., Ltd., Shenzhen (CN)

(72) Inventors: Jinlin Peng, Shanghai (CN); Hao Tang, Shanghai (CN); Yi Wang, Shanghai (CN); Fan Wang, Berkshire (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 76 days.

(21) Appl. No.: 16/712,541

(22) Filed: Dec. 12, 2019

(65) Prior Publication Data
US 2020/0145131 A1 May 7, 2020

Related U.S. Application Data

(63) Continuation of application No. PCT/CN2018/091336, filed on Jun. 14, 2018.

(30) Foreign Application Priority Data

Jun. 14, 2017 (CN) .......................... 201710448350.8

(51) Int. Cl.
*H04L 1/00* (2006.01)
*H04W 72/04* (2009.01)
*H04W 72/12* (2009.01)

(52) U.S. Cl.
CPC ......... *H04L 1/0038* (2013.01); *H04W 72/042* (2013.01); *H04W 72/0453* (2013.01); *H04W 72/1278* (2013.01)

(58) Field of Classification Search
CPC ... H04L 1/0038; H04L 5/0091; H04L 5/0053; H04W 72/042; H04W 72/0453;
(Continued)

(56) References Cited

U.S. PATENT DOCUMENTS

2004/0268351 A1* 12/2004 Mogensen .............. H04L 47/25
718/100
2010/0215011 A1* 8/2010 Pan .......................... H04L 5/14
370/329
(Continued)

FOREIGN PATENT DOCUMENTS

CN 101998584 A 3/2011
CN 102014494 A 4/2011
(Continued)

OTHER PUBLICATIONS

3GPP TSG RAN1 #51bis, Sevilla, Spain, Jan. 14-18, 2008 "Search Space Definition : Reduced PDCCH Blind Detection for Split PDCCH Search Space" Motorola, R1-080079, 4 pages. (Year: 2008).*

(Continued)

*Primary Examiner* — Ayaz R Sheikh
*Assistant Examiner* — Tarell A Hampton
(74) *Attorney, Agent, or Firm* — Slater Matsil, LLP

(57) ABSTRACT

In a scheduling method, a first device configures a blind detection parameter of a control channel based on a carrier type or a carrier group; or separately configures a blind detection period for different carriers; or configures a blind detection period for a USS and a CSS of a control channel; or configures a blind detection period for different downlink control information DCI; and then, sends configuration signaling that carries the blind detection parameter (which may include the blind detection period), where the blind detection parameter is used by a second device to perform blind detection on the control channel.

20 Claims, 10 Drawing Sheets

(58) Field of Classification Search
CPC ......... H04W 72/1278; H04W 72/1289; H04W 72/04; H04W 72/12; H04W 72/0406; H04W 72/1284
See application file for complete search history.

(56) References Cited

U.S. PATENT DOCUMENTS

| | | | | |
|---|---|---|---|---|
| 2011/0269492 | A1* | 11/2011 | Wang | H04L 47/14 455/509 |
| 2012/0063351 | A1* | 3/2012 | Kim | H04L 5/001 370/252 |
| 2012/0190395 | A1 | 7/2012 | Pan et al. | |
| 2012/0263052 | A1* | 10/2012 | Dai | H04L 5/001 370/252 |
| 2013/0070690 | A1* | 3/2013 | Moon | H04L 5/0053 370/329 |
| 2013/0088973 | A1* | 4/2013 | Yang | H04L 5/003 370/241 |
| 2014/0376457 | A1* | 12/2014 | Feng | H04W 72/042 370/329 |
| 2015/0055584 | A1* | 2/2015 | Lee | H04W 72/0413 370/329 |
| 2015/0195821 | A1* | 7/2015 | Li | H04L 5/0053 370/329 |
| 2015/0200741 | A1* | 7/2015 | Liu | H04J 11/0086 370/312 |
| 2016/0073421 | A1 | 3/2016 | Cui et al. | |
| 2016/0249337 | A1* | 8/2016 | Liang | H04W 72/042 |
| 2017/0208588 | A1* | 7/2017 | Park | H04L 27/2656 |
| 2017/0230994 | A1* | 8/2017 | You | H04L 5/0053 |
| 2017/0290008 | A1* | 10/2017 | Tooher | H04L 1/1893 |
| 2017/0325156 | A1* | 11/2017 | Wang | H04W 72/0413 |
| 2018/0014283 | A1* | 1/2018 | You | H04W 48/12 |
| 2018/0110045 | A1* | 4/2018 | You | H04J 11/00 |
| 2018/0234998 | A1 | 8/2018 | You et al. | |
| 2018/0279268 | A1* | 9/2018 | You | H04L 5/00 |
| 2018/0294860 | A1* | 10/2018 | Hakola | H04B 7/0695 |
| 2019/0007960 | A1* | 1/2019 | Fu | H04W 72/1289 |
| 2019/0174531 | A1* | 6/2019 | Takeda | H04W 72/1289 |

FOREIGN PATENT DOCUMENTS

| | | | |
|---|---|---|---|
| CN | 102368871 A | 3/2012 | |
| CN | 103457688 A | 12/2013 | |
| CN | 104135355 A | 11/2014 | |
| CN | 104936206 A | 9/2015 | |
| CN | 105578608 A | 5/2016 | |
| EP | 2424138 A2 | 2/2012 | |
| EP | 2512051 B1 | 1/2020 | |
| WO | 2016064048 A1 | 4/2016 | |
| WO | WO-2016064048 A1 * | 4/2016 | ......... H04W 72/042 |
| WO | 2017018758 A1 | 2/2017 | |

OTHER PUBLICATIONS

Samsung,"Carrier Aggregation Aspects in NR", R1-1708041, 3GPP TSG RAN WG1 #89, Hangzhou, China, May 15-19, 2017, 3 pages.

* cited by examiner

SCHEDULING METHOD AND RELATED APPARATUS

CROSS-REFERENCE TO RELATED APPLICATIONS

This application is a continuation of International Application No. PCT/CN2018/091336, filed on Jun. 14, 2018, which claims priority to Chinese Patent Application No. 201710448350.8, filed on Jun. 14, 2017. The disclosures of the aforementioned applications are hereby incorporated by reference in their entireties.

TECHNICAL FIELD

This application relates to the communications field, and more specifically, to a scheduling technology.

BACKGROUND

The LTE standard proposed by the 3GPP organization has been widely used in the world, and is referred to as a 4G communications technology. In LTE/LTE-A (LTE-Advanced), whether a terminal needs to receive data or whether data needs to be scheduled for transmission for a terminal in a transmission time unit (e.g., data is transmitted by using a transmission time unit as a granularity) depends on whether the terminal can detect downlink control information (DCI) that includes scheduling information. The DCI is carried by a physical downlink control channel (PDCCH). Therefore, the terminal needs to perform blind detection on the PDCCH in each transmission time unit. After DCI is detected, the terminal receives or sends data based on scheduling information in the DCI.

However, another communications technology may be different from LTE/LTE-A. For example, duration of a transmission time unit used for a carrier in LTE/LTE-A is 1 ms. In another communications technology, transmission time units used by different carriers may be different, and a transmission time unit may be a subframe or a transmission time interval (one transmission time interval is equal to a sum of duration of several subframes, or a sum of several transmission time intervals is equal to duration of one subframe); or may be one time domain symbol, a plurality of time domain symbols, one slot, an aggregation of a plurality of slots, one mini-slot, an aggregation of a plurality of mini-slots, an aggregation of a mini-slot and a slot, or the like. In other words, it can be understood that a quantity of symbols is variable. In addition, a subcarrier spacing supported in another communications technology may be 15 kHz*2^n, where n is an integer. Different subcarrier spacings are corresponding to different time domain symbol lengths, resulting in different transmission time units.

Because the two communications technologies are different, a scheduling mode proposed in LTE/LTE-A is inapplicable to another communications technology (for example, a future communications technology). How scheduling is implemented in another communications technology is a subject that needs to be studied at present.

SUMMARY

In view of this, embodiments of this application provide a scheduling method and a related apparatus, so as to implement scheduling in another communications technology.

To achieve the foregoing objective, the embodiments of this application provide the following technical solutions.

According to an aspect, an embodiment of this application provides a scheduling method, including: configuring, by a first device, a blind detection parameter of a control channel based on a carrier type or a carrier group (e.g., blind detection parameters configured for different carrier types or carrier groups may be identical or different), and sending configuration signaling that carries the blind detection parameter. A second device receives the blind detection parameter, and performs blind detection on the control channel based on the blind detection parameter. A specific control channel may be a downlink control channel, for example, a PDCCH. In specific implementation, blind detection parameters, corresponding to different carrier types or carrier groups, of a control channel may be predefined. For example, the blind detection parameters, corresponding to different carrier types, of the control channel may be formulated in a protocol. Certainly, a blind detection parameter may be separately configured by the base station for different carrier types based on an actual situation by using signaling. Signaling overheads can be reduced in the predefined manner, and relatively desirable flexibility and scalability can be achieved in the signaling manner. Moreover, the first device may use radio resource control (RRC) signaling, a master information block (MIB) message, a system information block (SIB) message, a radio media access control control element (MAC CE), or DCI as configuration signaling to carry the blind detection parameter. Alternatively, the first device may use a broadcast message as configuration signaling to carry the blind detection parameter, and in particular, a carrier-level blind detection parameter may be notified to each terminal by using the broadcast message. It can be learned that in the solution provided in this embodiment of this application, the first device configures the blind detection parameter based on the carrier type or the carrier group, and for carriers of a same type or carriers of a same group, the second device performs blind detection on the control channel by using a same blind detection parameter. After DCI that includes scheduling information is detected, data may be received or sent based on the scheduling information in the DCI, so as to implement scheduling. In addition, in the current system, a blind detection parameter is configured for each carrier, and a quantity of configuration signaling depends on a quantity of carriers. However, in this embodiment of this application, one type of carrier or one group of carriers is corresponding to one piece of configuration signaling. This can reduce overheads of the configuration signaling.

In a possible design, the carrier type includes a first carrier type, a second carrier type, and a third carrier type, where a carrier of the first carrier type supports carrying of a first control channel and a second control channel, the first control channel is a control channel for scheduling data of a current carrier, and the second control channel is a control channel for scheduling data of another carrier; a carrier of the second carrier type supports carrying of the first control channel; and a carrier of the third carrier type supports being scheduled by another carrier. Correspondingly, the first device may separately configure a blind detection parameter for a first-type carrier and a second-type carrier. In addition, the carrier type may be alternatively classified based on a subcarrier spacing or transmission time unit duration of a carrier. For example, carriers with a same subcarrier spacing or same transmission time unit duration may be classified into one type (for example, carriers with 15 k are classified into one type, and carriers with 30 k are classified into another type). Alternatively, carriers with subcarrier spacings or transmission time unit duration in a specific interval are classified into one type (for example, carriers with 15 k to 30 k are classified into one type, and carriers with 60 k~120 k are classified into another type). The blind detection parameter can be configured purposefully based on the carrier type. To be specific, the blind detection parameter is configured based on control information of one or more carriers on a carrier, so as to flexibly configure a parameter, balance quantities of blind detection times (for example, a carrier with scheduling information of another carrier requires more candidate locations), and reduce configuration signaling (there is no need to configure a blind detection parameter for each carrier).

In a possible design, the blind detection parameter may include at least one of an aggregation level set, a candidate control channel quantity factor set, a search space parameter, a DCI format, a control resource set, and a blind detection period. The aggregation level set may include at least one aggregation level value. The candidate control channel quantity factor set may include: a candidate control channel quantity factor corresponding to at least one aggregation level value; and certainly, all or some of aggregation levels may share one factor. The search space parameter represents detecting a specific search space, detecting a common search space, or detecting a specific search space and a common search space. Any one of the foregoing blind detection parameters has a function of reducing a quantity of blind detection times.

According to another aspect, an embodiment of this application provides a scheduling method, including: separately configuring, by a first device, a blind detection period for different carriers, and sending configuration signaling that carries a blind detection parameter. The blind detection parameter optionally includes the blind detection period. A second device receives the blind detection parameter sent by the first device, and performs blind detection on a control channel based on the blind detection parameter. In an example, the blind detection period may be configured based on a transmission time unit used for a carrier. For example, a blind detection period may be separately configured for different transmission time units. More specifically, a relatively long blind detection period may be configured for a relatively short transmission time unit duration, so as to reduce a quantity of blind detection times. In another example, the carriers may be classified into a carrier (a first-type carrier) for which a first transmission time unit is used and a carrier (a second-type carrier) for which a second transmission time unit is used. Duration of the second transmission time unit is greater than duration of the first transmission time unit. During blind detection period configuration, a first blind detection period may be configured for the first-type carrier, duration of the first blind detection period is N times of the duration of the first transmission time unit, and N≥1; and a second blind detection period may be configured for the second-type carrier, duration of the second blind detection period is M times of the duration of the second transmission time unit, and M≥1. For example, M<N may be further set, to ensure that within a given time such as 1 ms, a sum of quantities of times of blind detection performed on carriers corresponding to different transmission time units does not increase excessively compared with that in an existing LTE technology. In still another example, the first device may configure the blind detection period based on a subcarrier spacing, and separately configure a blind detection period for carriers with different subcarrier spacings. In still another example, the first device may configure the blind detection period based on a transmission time unit, a USS, and a CSS. In still another example, the first device may configure the blind detection period based on a subcarrier spacing, a USS, and a CSS. It can be learned that in this embodiment of this application, the blind detection period can be flexibly configured based on at least one of the transmission time unit, the subcarrier spacing, the USS, and the CSS, thereby reducing the quantity of blind detection times.

According to still another aspect, an embodiment of this application provides a scheduling method, and the method may be applied to a cross-carrier scheduling scenario in which control information of a second carrier is transmitted by using a first carrier. A first transmission time unit (represented by U1) is used for the first carrier, and a second transmission time unit (represented by U2) is used for the second carrier. Duration of the second transmission time unit is M times of duration of the first transmission time unit, and M is not less than 2; and M consecutive first transmission time units are aligned with one second transmission time unit. The method includes: transmitting the control information of the second carrier in at least one target first transmission time unit, where the target first transmission time unit is a first transmission time unit that is in the M first transmission time units and that is used to transmit the control information of the second carrier. A second device detects the control information in the target U1. The target first transmission time unit in the M first transmission time units is determined in a predefined manner or configured by using signaling, and the signaling includes higher layer signaling or physical layer signaling. More specifically, the first carrier may be used to transmit control information of one second carrier, or transmit control information of a plurality of second carriers. Further, the at least one target U1 may be one or more first transmission time units in the M U1s. In an example, when the first carrier is used to transmit control information of one second carrier, the control information of the second carrier may be carried in some U1s corresponding to the first carrier. The control information of the second carrier exists in some U1s of the M U1s, and subsequently a terminal needs to detect the control information of the second carrier only in these U1s. In another example, when the first carrier is used to transmit control information of a plurality of second carriers, a correspondence may be established between an index of a U1 and a second carrier. It should be noted that a correspondence between an index of a U1 and a second carrier may be predefined in a protocol, or the correspondence between an index of a U1 and a second carrier may be determined according to a rule or configured by using signaling. Signaling notification overheads can be reduced according to the predefined rule, and better flexibility and scalability can be provided in the signaling manner. It should be noted that this embodiment is applicable to a scenario "in which duration of the second transmission time unit is M (M is not less than 2) times of duration of the first transmission time unit", and is also applicable to a scenario without such a constraint. For example, this embodiment can also be applicable to a scenario "in which the second transmission time unit is equal to the first transmission time unit". It can be learned that in this embodiment of this application, the control information of the second carrier is transmitted in at least one of the M U1s. In this way, scheduling information of the second carrier may not need to be blindly detected in each U1, thereby reducing a quantity of blind detection times. In addition, all the foregoing embodiments are applicable to a single-carrier scenario in addition to the cross-carrier scheduling scenario. In the single-carrier scenario, the "first carrier" may be replaced with "downlink", and the "second carrier" may be replaced with "uplink". In other words, when different transmission time units or different subcarrier spacings are used for an uplink and a downlink, uplink scheduling control information does not need to be included in each downlink transmission time unit.

In a possible design, before the control information of the second carrier is transmitted, the first device may further configure respective blind detection parameters for the M first transmission time units. Flexible parameter configuration can be implemented by separately configuring the blind detection parameter for the U1s. In addition, the quantity of blind detection times can be reduced by separately configuring the blind detection parameter. More specifically, different transmission time units may be corresponding to different blind detection candidate locations by configuring different candidate PDCCH quantity factor sets or different control resource sets. Flexible parameter configuration can be implemented by separately configuring the blind detection parameter for the U1s, thereby reducing the quantity of blind detection times.

According to still another aspect, an embodiment of this application provides a scheduling method, including: separately configuring, by a first device, a blind detection parameter for M U1s, and sending configuration signaling that carries the blind detection parameter. A second device receives the configuration signaling, and performs, in each U1, blind detection on a control channel based on the blind detection parameter. In an example, blind detection parameters configured for different U1s are corresponding to different blind detection candidate resources or a same blind detection candidate resource, and then a terminal performs blind detection on the control channel on a blind detection candidate resource corresponding to each U1. More specifically, blind detection candidate resources (candidate locations) may be configured for different U1s by configuring a candidate control channel quantity factor set or a control resource set. In another example, control information or a control channel (of a carrier) that may be carried may be separately configured for different U1s. Flexible parameter configuration can be implemented by separately configuring the blind detection parameter for the U1s. The foregoing possible design may also be understood as: The blind detection parameter is separately configured for different transmission time units. For example, a control channel with a second carrier is configured for a $1^{st}$ first-carrier time unit, and a control channel without a second carrier is configured for a $2^{nd}$ first-carrier time unit. The foregoing possible design may be further understood as: The blind detection parameter is related to a location of the transmission time unit. For example, the first U1 is corresponding to a first CORESET and/or a first DCI set, and the second U1 is corresponding to a second CORESET and/or a second DCI set. For example, the first DCI set may include scheduling DCI of a first carrier and scheduling DCI of the second carrier, and the second DCI set includes the scheduling DCI of the first carrier.

According to still another aspect, an embodiment of this application provides a scheduling method, including: separately configuring, by a first device, a blind detection period for a specific search space (USS) and a common search space (CSS) of a control channel, and sending configuration signaling that carries a blind detection parameter, where the blind detection parameter is used by a second device to perform blind detection on the control channel, and the blind detection parameter optionally includes the blind detection period. The second device receives the configuration signaling, and performs blind detection on the control channel based on the blind detection parameter. Optionally, the second device may detect the USS by using the blind detection period configured for the USS, and detect the CSS by using the blind detection period configured for the CSS. For example, the first device may configure a blind detection period P1 for a USS of a control channel carried by a carrier 1, a blind detection period P2 for a CSS of the control channel carried by the carrier 1, a blind detection period P3 for a USS of a control channel carried by a carrier 2, and a blind detection period P4 for a CSS of the control channel carried by the carrier 2. In an example, the base station may configure the blind detection period based on a transmission time unit, a USS, and a CSS. For example, a blind detection period P1 is configured for a USS of a control channel carried by a first carrier type (or a first-type carrier), a blind detection period P2 is configured for a CSS of the control channel carried by the first carrier type (or the first-type carrier), a blind detection period P3 is configured for a USS of a control channel carried by a second carrier type (or a second-type carrier), and a blind detection period P4 is configured for a CSS of the control channel carried by the second carrier type (or the second-type carrier). By analogy, details are not further described herein. In another example, the base station may configure the blind detection period based on a subcarrier spacing, a USS, and a CSS. For example, a blind detection period P1 is configured for a USS of a control channel carried by a carrier with a subcarrier spacing of 15 kHz, a blind detection period P2 is configured for a CSS of the control channel carried by the carrier with a subcarrier spacing of 15 kHz (a first subcarrier spacing), a blind detection period P3 is configured for a USS of a control channel carried by a carrier with a subcarrier spacing of 30 kHz (a second subcarrier spacing), and a blind detection period P4 is configured for a CSS of the control channel carried by the carrier with a subcarrier spacing of 30 kHz. By analogy, details are not further described herein.

According to still another aspect, an embodiment of this application provides a scheduling method, including: configuring, by a first device, a blind detection period for different downlink control information DCI formats, or configuring a DCI format blind detection period based on a DCI format, and sending configuration signaling that carries a blind detection parameter or sending configuration signaling that carries the DCI format blind detection period, where the blind detection parameter is used by a second device to perform blind detection on a control channel, and the blind detection parameter optionally includes the blind detection period. The second device performs blind detection on the control channel based on the blind detection parameter corresponding to the DCI format or the DCI format blind detection period. Specifically, a blind detection parameter may be separately configured for DCI formats. Using the blind detection period as an example, a blind detection period may be separately configured for DCI formats. For example, a blind detection period 1 is configured for a DCI format 1, and a blind detection period 2 is configured for a DCI format 2. Configuration of another blind detection parameter is similar to that of the blind detection period, and reference may be made to the foregoing description. Details are not further described herein. DCI may have a DCI format for scheduling downlink data and a DCI format for scheduling uplink data, and DCI for scheduling the downlink data and DCI for scheduling the uplink data have different formats. Therefore, in an example, a blind detection parameter 1 (for example, a blind detection period P1) may be configured for the DCI format for scheduling uplink data (represented by a DCI format 1), and a blind detection parameter 2 (for example, a blind detection period P2) may be configured for the DCI format for scheduling downlink data (represented by a DCI format 2). In this way, if different subcarrier spacings or transmission time unit duration is used for an uplink and a downlink, uplink and downlink scheduling or uplink and downlink blind detection may be decoupled. For a scenario in which different transmission time unit duration or different subcarrier spacings are used for an uplink and a downlink, more specifically, a relatively long blind detection period may be configured for a DCI format corresponding to a relatively short transmission time unit duration for scheduling, so as to reduce a quantity of blind detection times. In another example, a blind detection period may be separately configured for formats of DCI with different uses or functions. Flexible parameter configuration is implemented by configuring the blind detection parameter based on the DCI format.

According to still another aspect, this application provides a computer-readable storage medium. The computer-readable storage medium stores an instruction, and when the instruction runs on a computer, the computer performs the methods in the foregoing aspects.

According to still another aspect, this application provides a computer program product that includes an instruction. When the computer program product runs on a computer, the computer performs the methods in the foregoing aspects.

According to still another aspect, this application provides a chip system, and the chip system includes a processor, configured to support a related device in implementing functions in the foregoing aspects, for example, generating or processing data and/or information in the foregoing methods. In a possible design, the chip system further includes a memory, and the memory is configured to store a program instruction and data that are necessary for the related device. The chip system may include a chip, or may include a chip and another discrete device.

It can be learned that in the solutions provided in the embodiments of this application, the first device configures the blind detection parameter based on the carrier type or the carrier group, and for carriers of a same type or carriers of a same group, the second device performs blind detection on the control channel by using a same blind detection parameter. After DCI that includes scheduling information is detected, data may be received or sent based on the scheduling information in the DCI, so as to implement scheduling. In addition, in the current system, a blind detection parameter is configured for each carrier, and a quantity of configuration signaling depends on a quantity of carriers. However, in the embodiments of this application, one type of carrier or one group of carriers is corresponding to one piece of configuration signaling. This can reduce overheads of the configuration signaling.

DETAILED DESCRIPTION OF ILLUSTRATIVE EMBODIMENTS

To facilitate understanding of technical solutions, some basic knowledge is described first.

A terminal receives data or data is scheduled for transmission for a terminal on a time-frequency resource allocated to the terminal. The time-frequency resource includes a time domain resource and a frequency domain resource. A granularity of the time-frequency resource may be a transmission time unit, and a granularity of the frequency domain resource may be a carrier or a smaller granularity, such as a subcarrier.

In a carrier aggregation technology, the terminal may use a plurality of carriers (for example, 10). In this application, a concept of a carrier is equivalent to that of a cell: When a secondary carrier is configured for the terminal, both a carrier index of the secondary carrier and a cell identity (Cell ID) of a secondary cell that works on the secondary carrier are carried simultaneously. In this case, it may be considered that the concept of the carrier is equivalent to that of the cell.

Whether the terminal needs to receive data or whether data is scheduled for transmission for the terminal in a transmission time unit on a carrier that is used by the terminal depends on whether the terminal can detect downlink control information (DCI) that includes scheduling information. The DCI is carried by a physical downlink control channel (PDCCH).

Figure 1A:
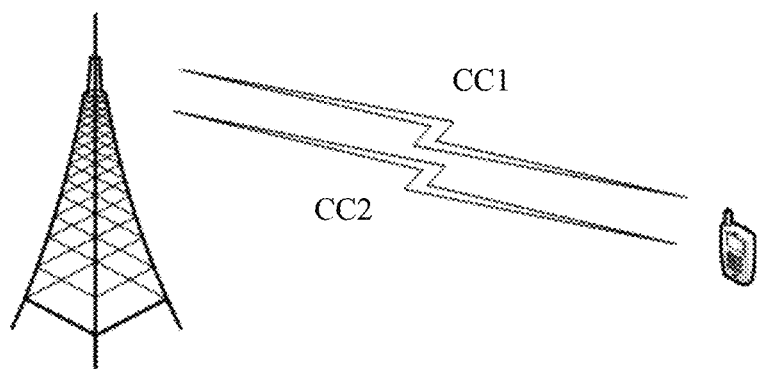
FIG. 1a is a schematic diagram of carrier aggregation according to an embodiment of this application.

With continuous growth of terminal users, a user service volume and a data throughput continue to increase, and a higher requirement is imposed on a communication rate. However, there is a shortage of radio spectrum resources, and it is quite difficult to find consecutive high bandwidths for use in mobile communication. Therefore, the carrier aggregation (CA) technology is introduced into LTE to aggregate a plurality of consecutive or inconsecutive spectrums. This technically satisfies a requirement of mobile communication for a high bandwidth, and increases utilization of scattered spectrums in a radio frequency band. For example, referring to FIG. 1a, a terminal may communicate with a base station simultaneously by using two carriers: CC1 and CC2.

In the carrier aggregation technology, cross-carrier scheduling or non-cross-carrier scheduling may be configured for the terminal. The non-cross-carrier scheduling is shown in FIG. 3b, and DCI carried by a PDCCH sent in each cell is corresponding to downlink resource allocation or uplink resource allocation of the cell. CC1 to CC3 indicate a carrier 1 to a carrier 3.

Figure 3A:
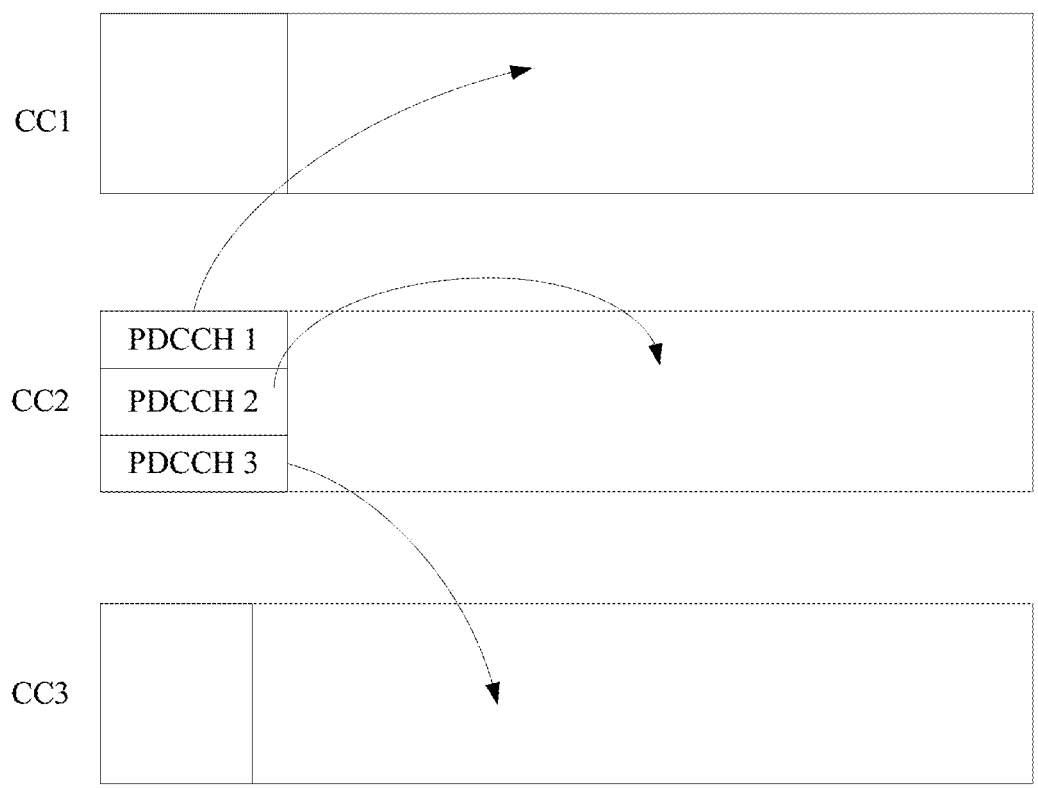
FIG. 3a is a schematic diagram of cross-carrier scheduling.
Figure 3B:
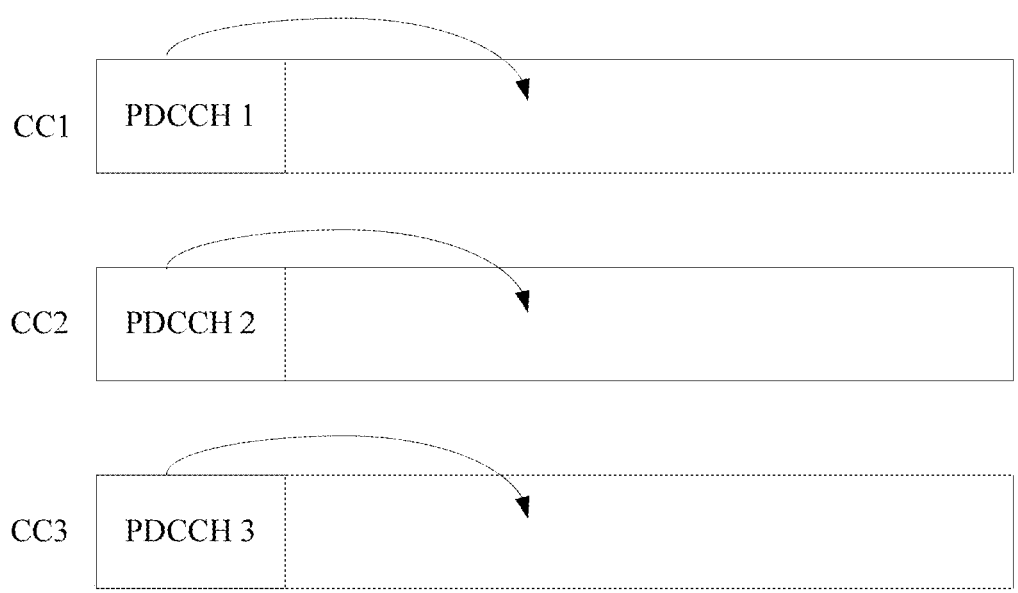
FIG. 3b is a schematic diagram of current carrier scheduling.

However, the cross-carrier scheduling is shown in FIG. 3a, and a PDCCH in one cell is allowed to schedule a radio resource in another cell. For example, a physical downlink shared channel (PDSCH) or a physical uplink control channel (PUCCH) corresponding to a PDCCH 1 on the CC2 is transmitted in another cell (CC1).

If cross-carrier scheduling is configured for the terminal, a base station notifies the terminal of a specific carrier (notify the terminal of a carrier number) on which the terminal needs to receive a corresponding PDCCH. During cross-carrier scheduling, in a subframe, cross-carrier scheduling is optionally performed on one downlink data transmission or one uplink transmission of another carrier.

A time-frequency resource occupied by a PDCCH is in a unit of a control channel element (CCE), and one CCE includes 36 resource elements (RE). The base station may choose to use one, two, four, or eight CCEs to carry one piece of DCI, which is referred to as an aggregation level (AL). The network side may configure a corresponding aggregation level based on a volume of transmitted information and a channel condition.

The terminal needs to search for a CCE aggregation level and a CCE start location of DCI in a control area. This process is referred to as PDCCH blind detection.

An LTE standard specifies a quantity of PDCCH candidates, or referred to as PDCCH candidate resources, corresponding to each aggregation level. A search space $S_k^{(L)}$ (CCE resource set) corresponding to an aggregation level $L \in \{1,2,4,8\}$ is defined as a set of PDCCH candidates.

The search space is classified into a common search space (CSS) and a UE-specific search space (USS). The CSS needs to be detected by all terminals in a cell, and the aggregation level may be 4 or 8. The USS is targeted for each terminal, and the aggregation level may be 1, 2, 4, or 8.

The terminal listens to the set of PDCCH candidates in one subframe, which means that the terminal needs to attempt to decode each PDCCH in the set based on a DCI format to be listened to. For each PDCCH candidate location, the terminal needs to attempt to decode two pieces of DCI with different lengths (specific DCI is determined based on a transmission mode configured in a network). Therefore, the terminal needs to perform blind detection for a maximum of 44 times in one downlink subframe.

In an LTE system, a CCE occupied by a PDCCH candidate m in a search space $S_k^{(L)}$ of a subframe k may be calculated by using the following formula:

$$L\{(Y_k+m') \bmod \lfloor N_{CCE,k}/L \rfloor\}+i$$

L is a size of an aggregation level, $N_{CCE,k}$ is a quantity of CCEs in a control area included in the subframe k, $i=0, \ldots, L-1$, and $m=0, \ldots, M^{(L)}-1$, $M^{(L)}$ is a quantity of PDCCH candidates that need to be listened to in a given search space. A relationship among $M^{(L)}$, an aggregation level, and a search space is listed in Table 1.

TABLE 1

| | Search space | | |
|---|---|---|---|
| Type | Aggregation level L | Size (quantity of occupied CCEs) | Quantity $M^{(L)}$ of PDCCH candidates |
| USS | 1 | 6 | 6 |
| | 2 | 12 | 6 |
| | 4 | 8 | 2 |
| | 8 | 16 | 2 |
| CSS | 4 | 16 | 4 |
| | 8 | 16 | 2 |

For the CSS, an equation m'=m holds true.

For the USS, when cross-carrier scheduling is not configured for the terminal, an equation m'=m holds true; or when cross-carrier scheduling is configured for the terminal, an equation $m'=m+M^{(L)} \cdot n_{CI}$ holds true, where $n_{CI}$ is a number of a carrier subject to cross-carrier scheduling.

The CSS starts from a CCE 0. A start location of the USS may be calculated by using the foregoing formula (corresponding to i=0).

For the CSS, $Y_k$ is 0. However, for the USS, $Y_k$ is defined as $Y_k = (A \cdot Y_{k-1}) \bmod D$, where $Y_{-1} = n_{RNTI} \neq 0$, $A = 3982$, $D = 65537$, $k = \lfloor n_s/2 \rfloor$, and $n_s$ is a slot number (a value range is 0 to 19) in a system frame.

It can be learned from the foregoing analysis that when cross-carrier scheduling is configured for the terminal, the search space is offset, and an offset value is $M^{(L)} \cdot n_{CI}$.

As listed in Table 1, in LTE, detecting a DCI format of one size in the USS requires 16 times of blind detection. If the CSS is considered at the same time, detecting a DCI format of one size requires 22 times of blind detection. In consideration of carrier aggregation, each time one active carrier is added, detecting a DCI format of one size requires 16 more times of blind detection (it is assumed that only the USS is considered).

Therefore, some methods for reducing a quantity of blind detection times are proposed in LTE-A R13. A blind detection parameter is configured for each aggregation level and each carrier, and the terminal may perform blind detection based on the configured blind detection parameter, so as to reduce the quantity of blind detection times. For example, if a scale factor a=0.33 is configured for the aggregation level 1 in Table 1, the terminal only needs to attempt to perform blind detection at the aggregation level 1 for 0.33*6=2 times (by default, blind detection is performed only on the first two PDCCH candidate locations), but does not need to perform blind detection for six times as listed in the table.

Another communications technology, especially a future communications technology, may be different from LTE/LTE-A.

Using a 5G access network technology (NR) as an example, different transmission time units are used by aggregated carriers in 5G NR. First, the 5G NR technology supports different subcarrier spacings, where the subcarrier spacing is mainly 15 kHz*2^n (n is a positive integer), that is, the subcarrier spacing is 15 kHz, 30 kHz, or the like. Different subcarrier spacings are corresponding to different symbol time lengths and transmission time units. In addition, during data transmission in 5G NR, a transmission time unit may be a subframe or a transmission time interval (one transmission time interval is equal to a sum of duration of several subframes, or a sum of several transmission time intervals is equal to duration of one subframe); or may be one time domain symbol, a plurality of time domain symbols, one slot, an aggregation of a plurality of slots, one mini-slot, an aggregation of a plurality of mini-slots, an aggregation of a mini-slot and a slot, or the like. In other words, it can be understood that a quantity of symbols is variable. Therefore, different transmission time units are used by the aggregated carriers in NR. However, transmission time units used by aggregated carriers in LTE/LTE-A are the same, and duration of the transmission time units is 1 ms. In addition, in the 5G NR technology, different subcarrier spacings or different transmission time intervals may be used for an uplink carrier and a downlink carrier, or different transmission time units may be configured for different bandwidth parts (BP).

In addition, compared with LTE, more services and richer spectrum resources need to be supported in 5G NR. For example, both low-frequency transmission and high-frequency transmission need to be supported. A spectrum resource at a high frequency band has a relatively high bandwidth, and is an effective manner for implementing high data rate communication. However, because of a radio propagation characteristic of the high frequency band, a path loss and a penetration loss of the high frequency band are more serious than those of a low frequency band. In addition, limited by transmit power of the terminal, uplink coverage and downlink coverage of both LTE and future 5G NR are unbalanced, and the uplink coverage is apparently weaker than the downlink coverage. From a service perspective, an uplink service requirement and a downlink service requirement are also unbalanced, and the downlink service requirement is higher than the uplink service requirement. To improve an uplink coverage capability of a 5G network, in view of relatively low resource utilization of an existing 4G network frequency band, the 5G network may reuse an existing 4G LTE frequency band, such as 1.8 GHz. For the 5G network, uplink coverage is a bottleneck. An uplink-downlink decoupling manner may be considered in the 5G network. To be specific, an LTE frequency band is reused only in an uplink, and a new frequency band such as a 3.5 GHz frequency band is used in a downlink.

In 5G NR, high-frequency uplink coverage is severely limited, and low-frequency deployment is mainly LTE deployment. However, when LTE is lightly loaded, particularly for an LTE frequency division duplex (FDD) uplink carrier, spectrum utilization is low. To fully utilize a spectrum resource of the LTE FDD uplink carrier, 5G NR uplink transmission and LTE FDD uplink transmission may share a same carrier, and an unused time-frequency resource on the LTE FDD uplink carrier is used to transmit uplink L1/L2 feedback information of 5G NR and NR uplink data. 5G NR and LTE FDD share a same carrier resource in an uplink, so that an uplink spectrum resource is fully utilized, and NR uplink coverage can be improved. That is, there is a scenario in which LTE and NR coexist in the future.

In addition, a dual connectivity technology enables UE to access technologies in at least two radio access technologies (such as LTE and NR) at the same time. This can also ensure coverage or a high throughput.

Because another communications technology is different from LTE, a scheduling mode (for example, a manner of reducing a quantity of blind detection times) proposed in LTE/LTE-A is inapplicable to another communications technology (for example, a future communications technology). How scheduling is implemented in another communications technology is a subject that needs to be studied at present.

In view of this, embodiments of this application provide a scheduling method and related apparatuses (a first device and a second device), to implement scheduling in another non-LTE communications technology.

A system operating environment of the first device and the second device is described first. The technology described in this application is applicable to communications systems that use various radio access technologies, for example, a system that uses an access technology such as code division multiple access (CDMA), frequency division multiple access (FDMA), time division multiple access (TDMA), orthogonal frequency division multiple access (OFDMA), or single carrier-frequency division multiple access (SC-FDMA). The technology is further applicable to a subsequent evolved system, such as a fifth generation 5G (which may also be referred to as new radio (NR)) system.

Figure 1B:
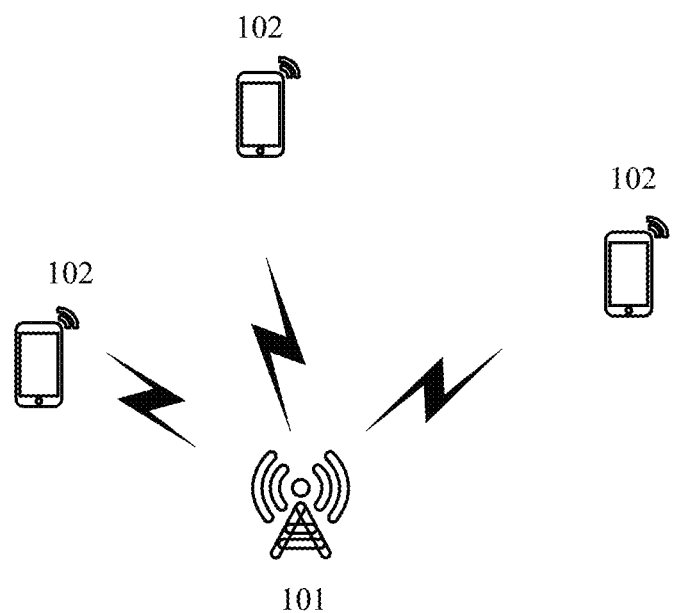
FIG. 1b is a schematic diagram of a communications system architecture according to an embodiment of this application.

FIG. 1b shows an example communications system architecture including a first device and a second device. The communications system includes a first device 101 and at least one second device (the figure shows three second devices 102), and the first device 101 communicates with each second device 102 by using a radio signal.

It should be understood that the communications system architecture shown in FIG. 1b shows only a case in which there is one first device 101. However, this application is not limited thereto. In addition to the first device 101, the communications system may include a neighboring first device and a neighboring second device that transmit a service on a same time-frequency resource. Coverage of each first device may further include another quantity of wireless communications devices. Further, optionally, the communications system in which the first device and the second device are located in FIG. 1b may further include another network entity and the like. This is not limited in this embodiment of this application.

The communions system to which this embodiment of this application is applied may be a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), another wireless communications system to which an orthogonal frequency division multiplexing (OFDM) technology is applied, or the like. The system architecture and a service scenario described in this embodiment of this application are intended to more clearly describe the technical solution in this embodiment of this application, and do not constitute any limitation on the technical solution provided in this embodiment of this application. A person of ordinary skill in the art may know that, as a network architecture evolves and a new service scenario emerges, the technical solution provided in this embodiment of this application is also applicable to similar technical issues.

Figure 2A:
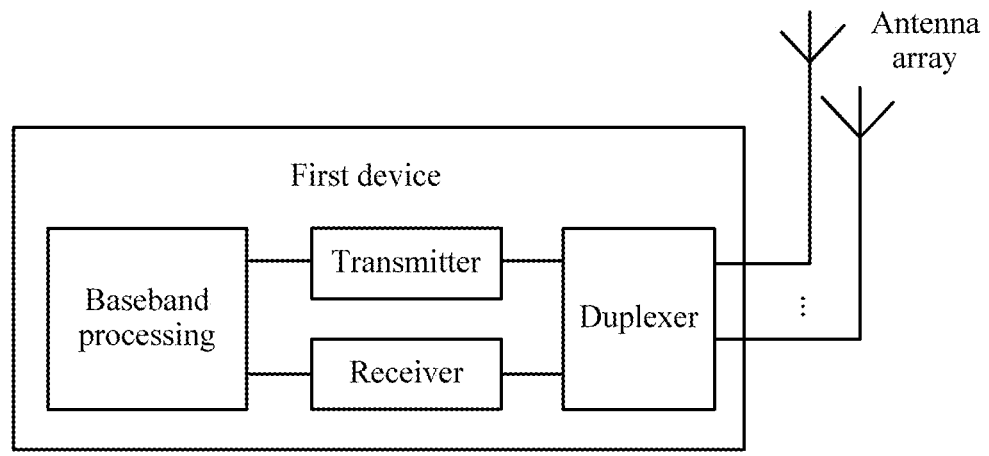
FIG. 2a and FIG. 2b are example structural diagrams of a first device according to an embodiment of this application.
Figure 2B:
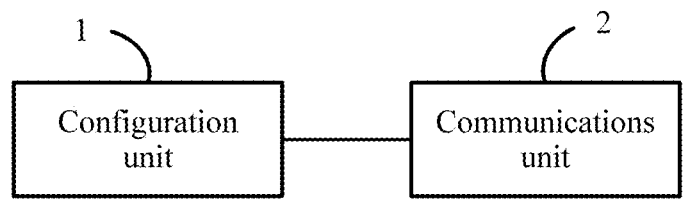
Figure 2C:
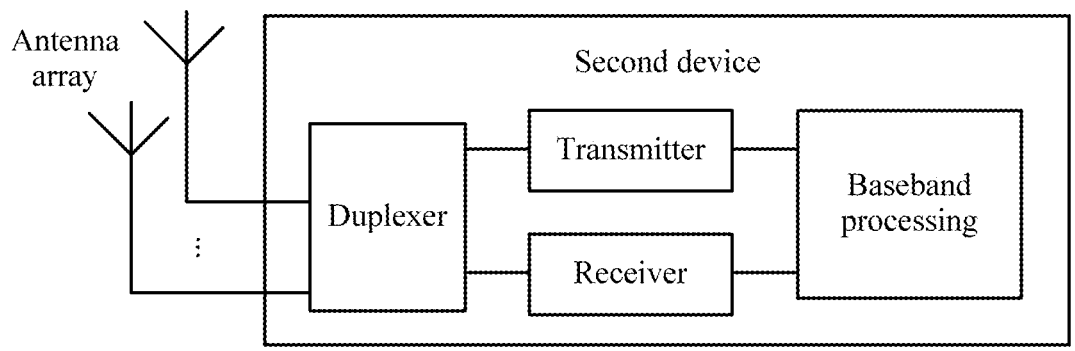
FIG. 2c and FIG. 2d are example structural diagrams of a second device according to an embodiment of this application.

Further, refer to both FIG. 2a and FIG. 2c. FIG. 2a shows an example structure of the first device 101 in the communications system shown in FIG. 1b. As shown in FIG. 2a, the first device may include an antenna array, a duplexer, a transmitter (TX), a receiver (RX) (the TX and the RX may be collectively referred to as a transceiver TRX), and a baseband processing part.

The duplexer is configured to implement the antenna array, and may be configured to send a signal and receive a signal. The TX is configured to implement conversion between a radio frequency signal and a baseband signal. Generally, the TX may include a power amplifier (PA), a digital to analog converter (DAC), and a frequency converter. The RX may include a low-noise amplifier (LNA), an analog to digital converter (ADC), a frequency converter, and the like.

The baseband processing part is configured to implement processing of a sent signal or a received signal, such as layer mapping, precoding, modulation/demodulation, and coding/decoding, and separately process a physical control channel, a physical data channel, a physical broadcast channel, a reference signal, and the like. Further, the first device may further include a control part that is configured to perform scheduling, resource allocation, pilot scheduling, user physical layer parameter configuration, and the like.

The control part works in coordination with another device, and may be configured to implement scheduling methods provided in the following embodiments shown in FIG. 4, FIG. 6, FIG. 7, FIG. 10, and FIG. 11.

FIG. 2b shows another example structure of the first device 101. The first device 101 includes a configuration unit 1 and a communications unit 2. A function of each unit is subsequently described in this specification with reference to a design method.

FIG. 2c shows an example structure of the second device 102 in the communications system shown in FIG. 1b. The second device may include an antenna, a duplexer, a TX, an RX (the TX and the RX may be collectively referred to as a transceiver TRX), and a baseband processing part.

As shown in FIG. 2c, the second device has a plurality of antennas (that is, an antenna array). It should be understood that the second device may alternatively have a single antenna.

The duplexer enables the antenna array to send a signal and receive a signal. The TX is configured to implement conversion between a radio frequency signal and a baseband signal. Generally, the TX may include a PA, a DAC, and a frequency converter, and the RX may include an LNA, an ADC, and a frequency converter.

The baseband processing part is configured to implement processing of a sent signal or a received signal, such as layer mapping, precoding, modulation/demodulation, and coding/decoding, and separately process a physical control channel, a physical data channel, a physical broadcast channel, a reference signal, and the like. Further, the second device may further include a control part that is configured to request an uplink physical resource, determine whether a downlink data packet is successfully received, and the like.

The first device may be a base station, or another device that can send a control channel. The base station in this application is an apparatus that is deployed in a radio access network (RAN) and that is configured to provide a wireless communication function for the second device. The base station may include a macro base station, a micro base station, a relay node, an access point, a base station controller, a transmission/reception point (TRP), and the like in various forms. In systems using different radio access technologies, a specific name of the base station may vary. For example, the base station is referred to as an evolved NodeB (eNB, or eNodeB) in an LTE network, and the base station may be referred to as a new radio NodeB (gNB) in a future evolved system.

The second device may be specifically a device providing voice and/or data connectivity for a user, and may include a wired terminal and a wireless terminal. The wireless terminal may be a handheld device with a wireless connection function, another processing device connected to a wireless modem, or a mobile terminal that communicates with one or more core networks through a radio access network. For example, the wireless terminal may be a mobile phone, mobile station, a computer, a tablet computer, a personal digital assistant (PDA), a mobile Internet device (MID), a wearable device, or an e-book reader. For another example, the wireless terminal may be a portable, pocket-sized, handheld, computer built-in, or in-vehicle mobile device. For still another example, the wireless terminal may be a mobile station or an access point. In addition, user equipment (UE) is a type of terminal, and is a name of the terminal in an LTE system. For ease of description, the devices mentioned above are collectively referred to as terminals in subsequent descriptions of this application.

Figure 2D:
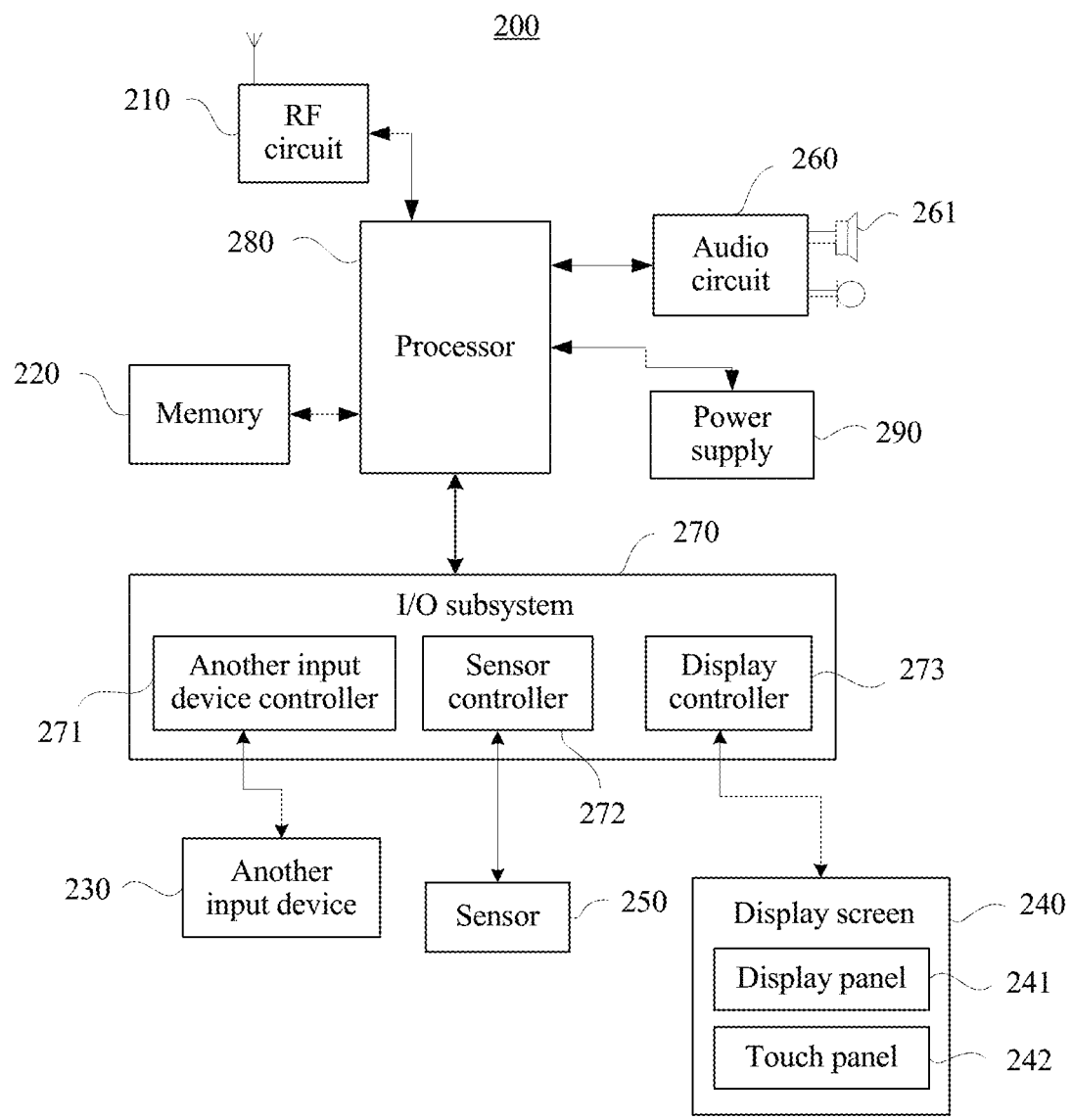

For example, the second device is a mobile phone. FIG. 2d is a block diagram of a partial structure of a mobile phone 200 related to this embodiment of this application. Referring to FIG. 2d, the mobile phone 200 includes components such as an Radio Frequency (RF) circuit 210, a memory 220, another input device 230, a display screen 240, a sensor 250, an audio circuit 260, an I/O subsystem 270, a processor 280, and a power supply 290. A person skilled in the art may understand that the structure of the mobile phone shown in FIG. 2d does not constitute any limitation on the mobile phone, and the mobile phone may include more or fewer components than those shown in the figure, or some components may be combined, or some components may be separated, or a different component arrangement may be used. A person skilled in the art may understand that the display screen 240 is a user interface (UI), and the mobile phone 200 may include more or fewer user interfaces than those shown in the figure.

The following describes in detail each constituent component of the mobile phone 200 with reference to FIG. 2d.

The RF circuit 210 may be configured to receive and send signals in an information receiving/sending process or a call process. In particular, after receiving downlink information from a base station, sending the downlink information to the processor 280 for processing, and sends uplink related data to the base station. The RF circuit usually includes but is not limited to an antenna, at least one amplifier, a transceiver, a coupler, an LNA, and a duplexer. In addition, the RF circuit 210 may also communicate with a network and another device through wireless communication. For the wireless communication, any communication standard or protocol may be used, including but not limited to: a global system for mobile communications (GSM), general packet radio service (GPRS), code division multiple access (CDMA), wideband code division multiple access (WCDMA), long term evolution (LTE), e-mail, short message service (SMS), and a 5G access network technology (NR).

The memory 220 may be configured to store a software program and a module. The processor 280 performs various function applications and data processing of the mobile phone 200 by running the software program and the module that are stored in the memory 220. The memory 220 may mainly include a program storage area and a data storage area. The program storage area may store an operating system, an application program required by at least one function (such as a voice playback function and an image playback function), and the like. The data storage area may store data (such as audio data and a phone book) created based on use of the mobile phone 200, and the like.

In addition, the memory 220 may include a high-speed random access memory, and may further include a non-volatile memory, such as at least one magnetic disk storage device, a flash memory device, or another volatile solid-state storage device.

The another input device 230 may be configured to receive input digit or character information, and generate key signal input related to user setting and function control of the mobile phone 200.

Specifically, the another input device 230 may include but is not limited to one or more of a physical keyboard, a function key (such as a volume control key or an on/off key), a trackball, a mouse, a joystick, and an optical mouse (the optical mouse is a touch-sensitive surface that does not display visual output, or an extension of a touch-sensitive surface formed by a touchscreen). The another input device 230 is connected to another input device controller 271 of the I/O subsystem 270, and exchanges a signal with the processor 280 under control of the another input device controller 271.

The display screen 240 may be configured to display information entered by a user or information provided for a user, and various menus of the mobile phone 200, and may further receive user input. Specifically, the display screen 240 may include a display panel 241 and a touch panel 242. The display panel 241 may be configured in a form of a liquid crystal display (LCD), an organic light-emitting diode (OLED), or the like. The touch panel 242 is also referred to as a touchscreen, a touch-sensitive screen, or the like, and may collect a contact or non-contact operation performed by the user on or near the touch panel 242 (such as an operation performed by the user on or near the touch panel 242 by using any suitable object or accessory such as a finger or a stylus, or a motion sensing operation, where the operation includes a single-point control operation, a multi-point control operation, and another type of operation), and drive a corresponding connection apparatus according to a preset program.

Optionally, the touch panel 242 may include two parts: a touch detection apparatus and a touch controller. The touch detection apparatus detects a touch position and a gesture of the user, detects a signal generated by the touch operation, and transmits the signal to the touch controller. The touch controller receives touch information from the touch detection apparatus, converts the touch information into information that can be processed by the processor, and sends the information to the processor 280, and is also capable of receiving and executing a command sent by the processor 280. In addition, the touch panel 242 may be implemented by using a plurality of types, such as a resistive type, a capacitive type, an infrared type, or a surface acoustic wave type, or the touch panel 242 may be implemented by using any technology developed in the future.

Further, the touch panel 242 may cover the display panel 241. The user may perform, based on content displayed on the display panel 241 (the displayed content includes but is not limited to a soft keyboard, a virtual mouse, a virtual key, and an icon), an operation on or near the touch panel 242 covering the display panel 241. After detecting the operation on or near the touch panel 242, the touch panel 242 transmits information about the operation to the processor 280 by using the I/O subsystem 270, to determine the user input. Subsequently, the processor 280 provides corresponding visual output on the display panel 241 based on the user input by using the I/O subsystem 270. In FIG. 2*d*, the touch panel 242 and the display panel 241 are used as two independent parts to implement input and output functions of the mobile phone 200. However, in some embodiments, the touch panel 242 and the display panel 241 can be integrated to implement the input and output functions of the mobile phone 200.

The mobile phone 200 may further include at least one sensor 250, such as a light sensor, a motion sensor, and another sensor. Specifically, the light sensor may include an ambient light sensor and a proximity sensor. The ambient light sensor may adjust luminance of the display panel 241 based on brightness of ambient light. The proximity sensor may turn off the display panel 241 and/or backlight when the mobile phone 200 moves close to an ear. As a type of motion sensor, an accelerometer sensor may detect values of acceleration value in various directions (usually, there are three axes), may detect, in a static state, a value and a direction of gravity, and may be used for applications that recognize a mobile phone posture (for example, screen switching between a landscape mode and a portrait mode, a related game, and magnetometer posture calibration), vibration-recognition-related functions (for example, a pedometer and tapping), and the like. Other sensors that can be configured on the mobile phone 200 such as a gyroscope, a barometer, a hygrometer, a thermometer, and an infrared sensor are not described herein.

The audio circuit 260, a speaker 261, and a microphone 262 may provide an audio interface between the user and the mobile phone 200. The audio circuit 260 may transmit, to the speaker 261, a signal that is obtained after conversion of received audio data, and the speaker 261 converts the signal into a sound signal and outputs the sound signal. In addition, the microphone 262 converts a collected sound signal into a signal; and the audio circuit 260 receives the signal and converts the signal into audio data, and outputs the audio data to the RF circuit 210 to send the audio data to, for example, another mobile phone, or outputs the audio data to the memory 220 for further processing.

The I/O subsystem 270 is configured to control input and output peripheral devices, and may include the another input device controller 271, a sensor controller 272, and a display controller 273.

Optionally, one or more other input device controllers 271 receive a signal from the another input device 230 and/or send a signal to the another input device 230.

The another input device 230 may include a physical button (a press button, a rocker button, or the like), a dial, a slider switch, a joystick, a click scroll wheel, and an optical mouse (the optical mouse is a touch-sensitive surface that does not display visual output, or an extension of a touch-sensitive surface formed by a touchscreen).

It should be noted that the another input device controller 271 may be connected to any one or more of the foregoing devices.

The display controller 273 in the I/O subsystem 270 receives a signal from the display screen 240 and/or sends a signal to the display screen 240. After the display screen 240 detects user input, the display controller 273 converts the detected user input into interaction with a user interface object displayed on the display screen 240, to implement human-machine interaction. The sensor controller 272 may receive and/or send a signal from/to one or more sensors 250.

The processor 280 is a control center of the mobile phone 200, is connected to all the parts of the entire mobile phone by using various interfaces and lines, and by running or executing the software program and/or the module that are/is stored in the memory 220 and by invoking data stored in the memory 220, performs various functions and data processing of the mobile phone 200, so as to perform overall monitoring on the mobile phone. Optionally, the processor 280 may include one or more processing units. Preferably, an application processor and a modem processor may be integrated into the processor 280. The application processor mainly processes an operating system, a user interface, an application program, and the like, and the modem processor mainly processes wireless communication. It can be understood that the modem processor may alternatively not be integrated into the processor 280.

The mobile phone 200 further includes the power supply 290 (for example, a battery) supplying power to all the components. Preferably, the power supply may be logically connected to the processor 280 by using a power management system, so that functions such as charging and discharging management and power consumption management are implemented by using the power management system.

Although not shown, the mobile phone 200 may further include a camera, a Bluetooth module, and the like, and details are not described herein.

Figure 4:
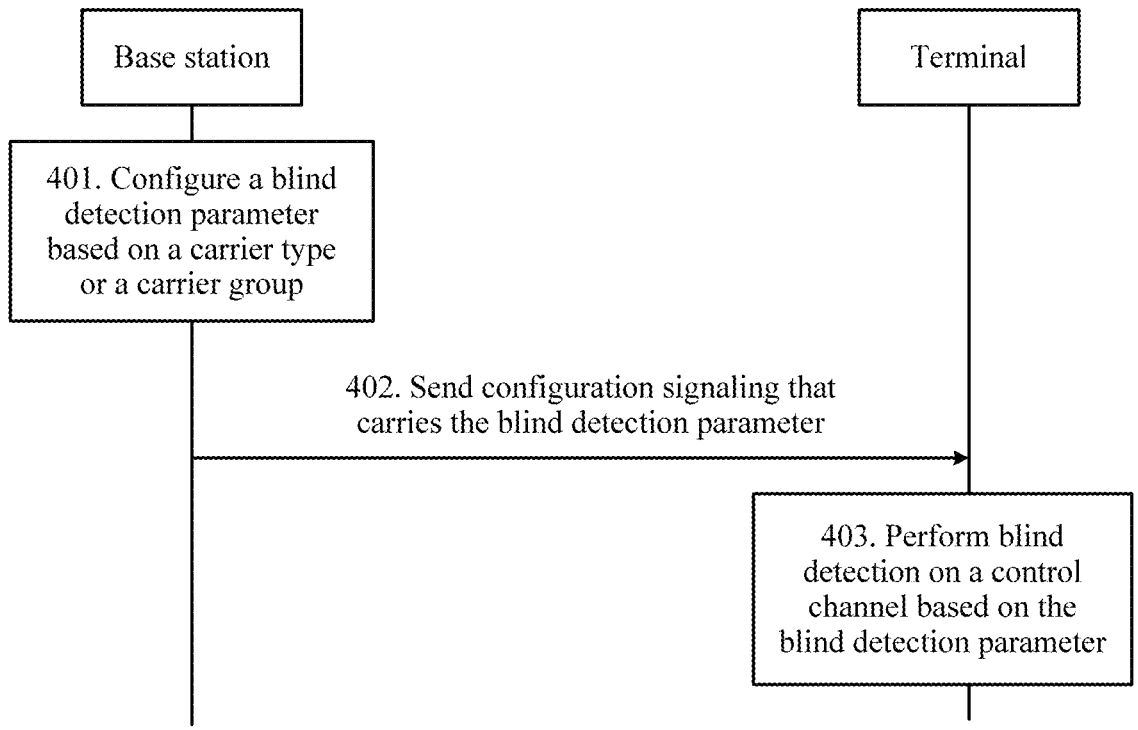
FIG. 4, FIG. 6, FIG. 7, FIG. 10, and FIG. 11 are example structural diagrams of a scheduling method according to an embodiment of this application.
Figure 6:
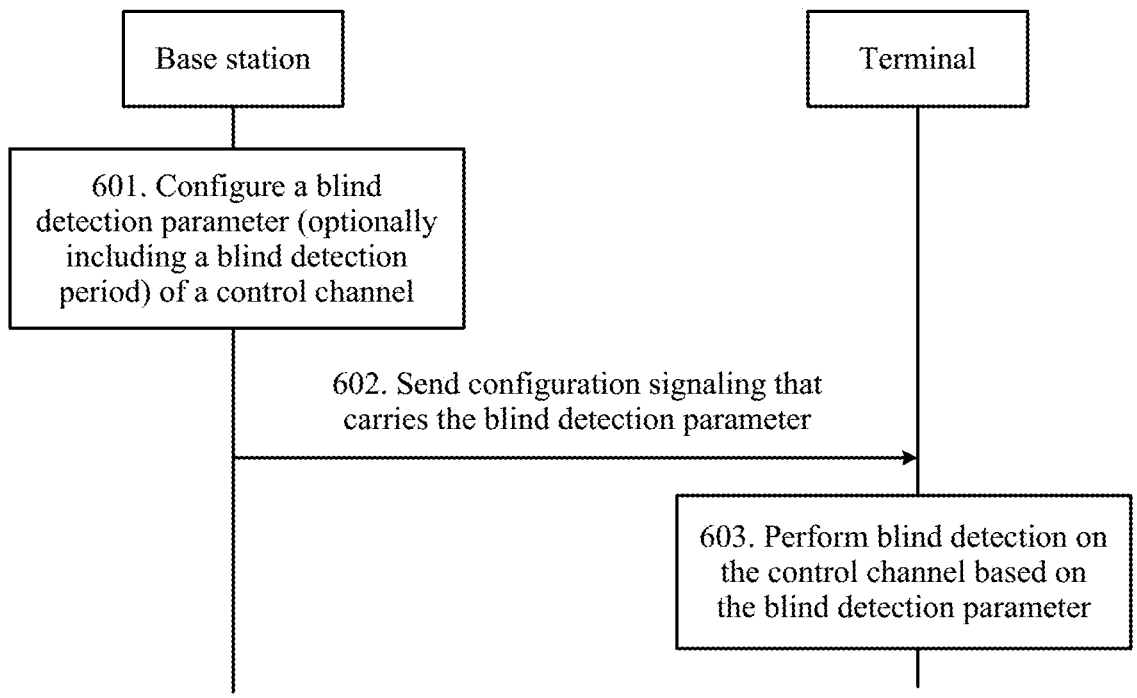
Figure 7:
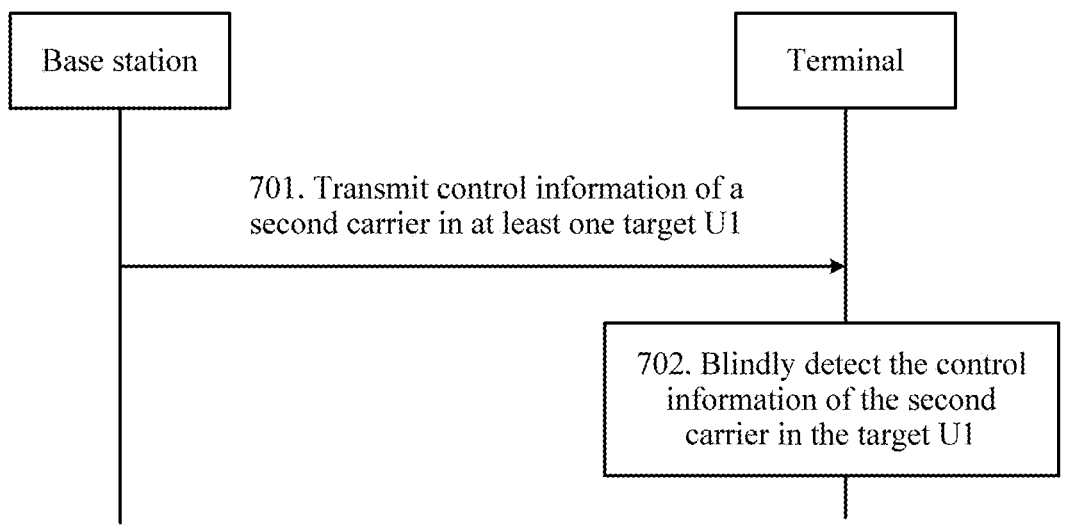
Figure 11:
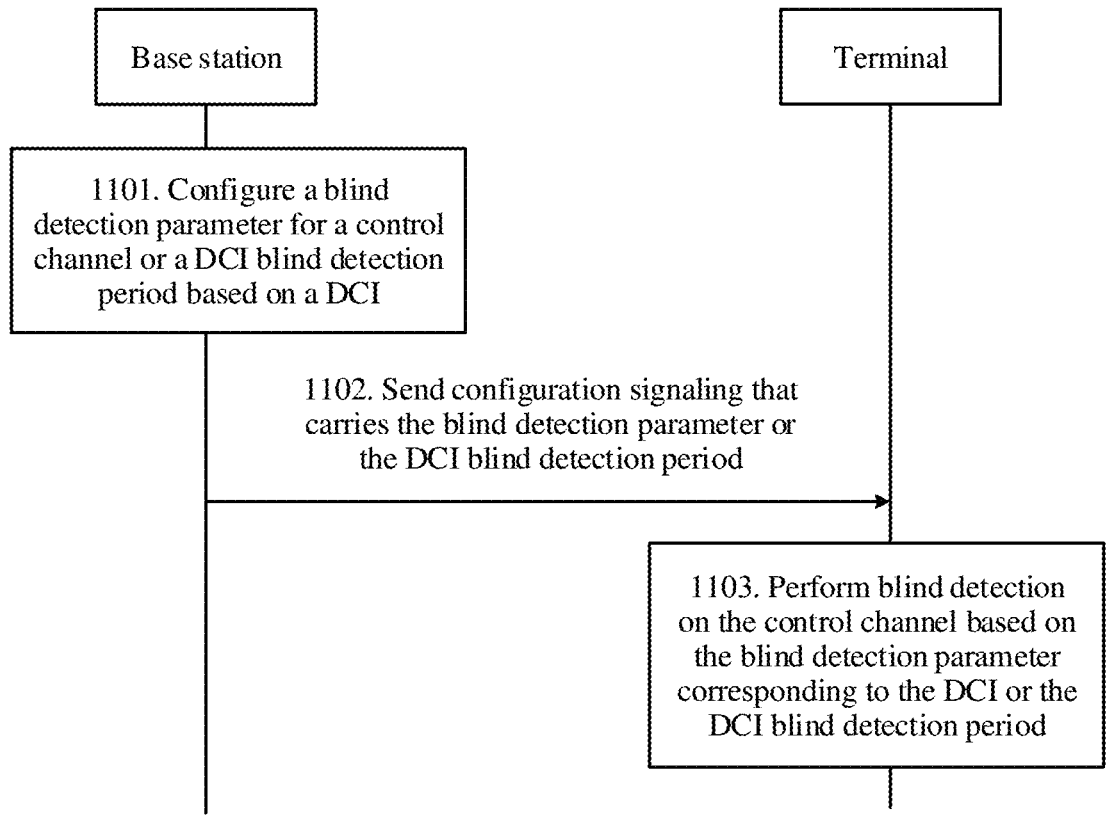

The processor 280 executes the program stored in the memory 220 and invokes another device, to implement actions completed by terminals in the scheduling methods provided in the embodiments shown in FIG. 4, FIG. 6, FIG. 7, FIG. o0, and FIG. 11.

This application may be applied to a carrier aggregation scenario, a scenario in which another communications technology coexists with LTE, a dual connectivity scenario, an uplink/downlink scenario of one carrier, and a scenario of different BPs of one carrier. For ease of description, the following mainly uses the carrier aggregation scenario as an example for description. The other scenarios are similar, and details are not described.

The following describes a scheduling solution by using an example in which a first device is a base station, a second device is a mobile terminal, and a control channel is a PDCCH (which may also be referred to as an NR-PDCCH in a future communications technology).

FIG. 4 shows an example interaction procedure of a scheduling method. The interaction procedure may be applied to the foregoing application scenarios, for example, may be applied to the carrier aggregation scenario and the scenario in which a plurality of communications technologies coexist.

The interaction procedure includes at least the following steps.

S401. The base station configures a blind detection parameter of the PDCCH based on a carrier type or a carrier group.

Specifically, a blind detection parameter may be separately configured for different carrier types or carrier groups.

For example, if carriers are classified into three types, a blind detection parameter may be separately configured for the three types. Similarly, if the carriers are grouped into two groups, a blind detection parameter may be separately configured for the two groups.

It should be noted that the base station may configure a blind detection parameter at a user level. For example, the base station may configure a blind detection parameter for a terminal based on a carrier type of a carrier used by the terminal or a carrier group to which the carrier used by the terminal belongs. Alternatively, the base station may configure a blind detection parameter at a carrier level. For example, the base station may use a total of N carriers. If the N carriers belong to P carrier types or Q carrier groups, a blind detection parameter may be configured for each of the P carrier types, or a blind detection parameter may be configured for each of the Q carrier groups.

Figure 5:
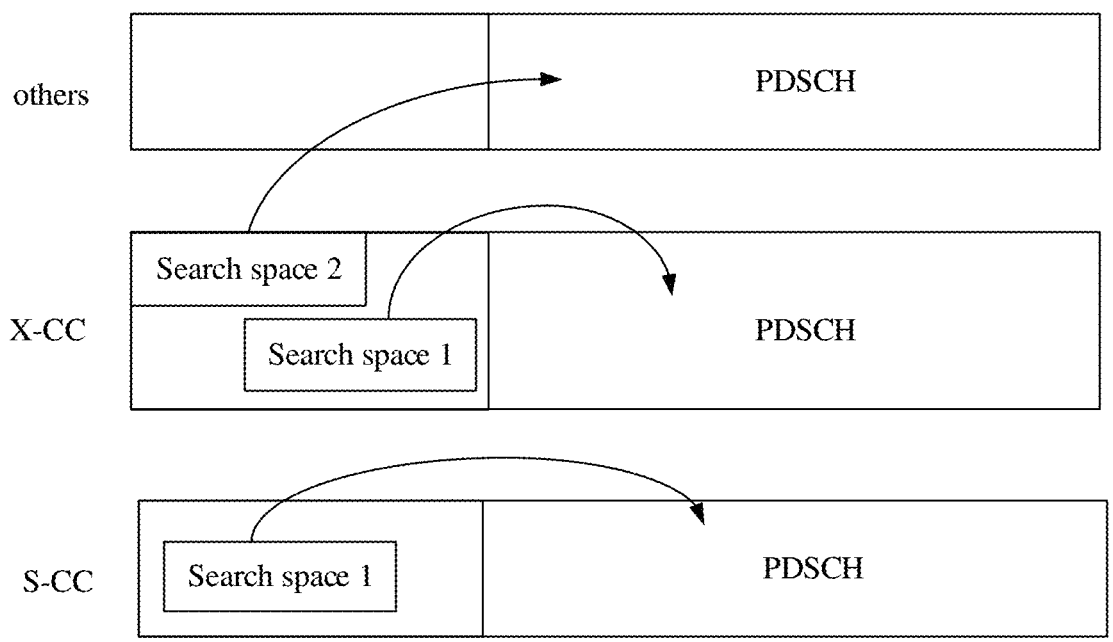
FIG. 5 is a schematic diagram of different carrier types according to an embodiment of this application.

In an example, carrier types may be classified into a first carrier type, a second carrier type, and a third carrier type based on a control channel supported by a carrier. Referring to FIG. 5:

A carrier (represented by X-CC) of the first carrier type supports carrying of a first control channel and a second control channel, the first control channel is a control channel for scheduling data of a current carrier, and the second control channel is a control channel for scheduling data of another carrier.

In other words, the terminal may blindly detect, on the X-CC, a search space 1 of the current carrier and a search space 2 of the another carrier.

A carrier (represented by S-CC) of the second carrier type supports carrying of the first control channel. That is, the terminal may blindly detect, on the S-CC, only the search space 1 of the current carrier.

A carrier (represented by others) of the third carrier type supports being scheduled by another carrier.

Correspondingly, in this example, the "configuring a blind detection parameter based on a carrier type" may specifically include: separately configuring a blind detection parameter for the first-type carrier and the second-type carrier. In this way, the blind detection parameter can be configured purposefully. To be specific, the blind detection parameter is configured based on control information of one or more carriers on a carrier, so as to flexibly configure a parameter, balance quantities of blind detection times (for example, a carrier with scheduling information of another carrier requires more candidate locations), and reduce configuration signaling (there is no need to configure a blind detection parameter for each carrier).

In another example, the carrier type may be alternatively classified based on a subcarrier spacing or transmission time unit duration of a carrier. Optionally, carriers with a same subcarrier spacing or same transmission time unit duration may be classified into one type (for example, carriers with 15 k are classified into one type, and carriers with 30 k are classified into another type). Alternatively, carriers with subcarrier spacings or transmission time unit duration in a specific interval are classified into one type (for example, carriers with 15 k to 30 k are classified into one type, and carriers with 60 k~120 k are classified into another type). Examples are as follows:

The carrier of the first carrier type is a carrier with a subcarrier spacing of X1 or transmission time unit duration of L1;

the carrier of the second carrier type is a carrier with a subcarrier spacing of X2 or transmission time unit duration of L2;

the carrier of the third carrier type is a carrier with a subcarrier spacing of X3 or transmission time unit duration of L3;

. . .

By analogy, details are not further described.

In this way, the blind detection parameter can be configured purposefully. To be specific, the blind detection parameter is configured based on transmission time unit duration or a subcarrier spacing of a carrier, so as to flexibly configure a parameter, balance quantities of blind detection times (for example, for a carrier with a relatively short transmission time unit, a relatively small quantity of blind detection candidate locations are configured in each transmission time unit, to ensure that within a given time such as 1 ms, a sum of quantities of blind detection times does not increase excessively compared with that in an existing LTE technology), and reduce configuration signaling (there is no need to configure a blind detection parameter for each carrier).

In specific implementation, blind detection parameters, corresponding to different carrier types, of a PDCCH may be predefined. For example, the blind detection parameters, corresponding to different carrier types, of the PDCCH may be formulated in a protocol. Certainly, a blind detection parameter may be separately configured by the base station for different carrier types based on an actual situation by using signaling. Signaling overheads can be reduced in the predefined manner, and relatively desirable flexibility and scalability can be achieved in the signaling manner.

Similarly, the carrier groups may also be grouped based on at least one of a control channel supported by each carrier, duration of a used transmission time unit, and a subcarrier spacing. In specific implementation, blind detection parameters, corresponding to different carrier groups, of a PDCCH may be predefined. For example, the blind detection parameters, corresponding to different carrier groups, of the PDCCH may be formulated in a protocol. Certainly, a blind detection parameter may be separately configured by the base station for different carrier groups based on an actual situation by using signaling. Signaling overheads can be reduced in the predefined manner, and relatively desirable flexibility and scalability can be achieved in the signaling manner.

Step 401 may be performed by the configuration unit 1.

S402. The base station sends configuration signaling that carries the blind detection parameter.

The blind detection parameter is used by the second device to perform blind detection on the control channel.

It should be noted that the blind detection parameters in all the embodiments of this application may also be referred to as monitoring parameters or detection parameters. Blind detection in all the embodiments of this application may also be referred to as monitoring or detection.

More specifically, the base station may use radio resource control (RRC) signaling, a master information block (MIB) message, a system information block (SIB) message, a radio media access control control element (MAC CE), or DCI as configuration signaling to carry the blind detection parameter.

Alternatively, the base station may use a broadcast message as configuration signaling to carry the blind detection parameter, and in particular, a carrier-level blind detection parameter may be notified to each terminal by using the broadcast message.

In this embodiment of this application, one type of carrier or one group of carriers is corresponding to one piece of configuration signaling. If the base station supports three carrier types, or carriers allocated to a terminal have three types, the base station sends at most three pieces of configuration signaling. Assuming that a terminal supports 10 carriers, carriers 1-3 are of a first type, carriers 4-7 are of a second type, and carriers 8-10 are of a third type, the base station sends at most three pieces of configuration signaling to the terminal.

However, in the current system, a blind detection parameter is configured for each carrier, and a quantity of configuration signaling depends on a quantity of carriers. Therefore, if 10 carriers are allocated to the terminal, 10 pieces of configuration signaling need to be sent to the terminal. Apparently, overheads of configuration signaling can be reduced in this embodiment of this application.

The following describes the blind detection parameter.

The blind detection parameter may include at least one of an aggregation level set, a candidate control channel quantity factor set, a search space parameter, a DCI format, a control resource set (CORESET), and a blind detection period.

(1) The aggregation level set includes at least one aggregation level value. Using the X-CC and the S-CC as an example, an aggregation level set of a USS and/or a CSS that need/needs to be detected may be separately configured for the X-CC and the S-CC.

An aggregation level set configured for a carrier type may include only one aggregation level value, and certainly, may alternatively include two, three, or more aggregation level values. This is not limited in this embodiment of this application. Still using the X-CC and the S-CC as an example, an aggregation level set configured for the X-CC includes aggregation level values {1, 2, 4}, and an aggregation level set configured for the S-CC includes aggregation level values {2, 4, 8}. In this way, subsequently the terminal does not need to detect aggregation levels 1, 2, 4, and 8 on each carrier, as listed in Table 1. Therefore, a quantity of blind detection times is reduced.

(2) The candidate control channel quantity factor set includes a candidate control channel quantity factor corresponding to at least one aggregation level value. Aggregation level values may be all corresponding to one candidate control channel quantity factor, or may be separately corresponding to respective candidate control channel quantity factors.

Using the X-CC as an example, a candidate control channel quantity factor set of the USS that needs to be detected may be configured as {0.33, 0.66, 1, 1} for the X-CC. Therefore, quantities of times of blind detection performed on the USS corresponding to the X-CC at aggregation levels are {0.33*6, 0.66*6, 1*2, 1*2} (namely, {2, 4, 2, 2}), respectively.

In this way, subsequently the terminal does not need to perform blind detection for 6, 6, 2, and 2 times at the aggregation levels, respectively, as listed in Table 1. This reduces the quantity of blind detection times.

It should be noted that a blind detection sequence or a blind detection location may be further configured (configured by using signaling or predefined). For example, the quantity of times of blind detection performed on the USS corresponding to the X-CC at an aggregation level 1 is 2. Blind detection may be configured to be performed in a forward direction (the forward direction means a direction from the first CCE to the last CCE) sequence or a reverse direction (the reverse direction means a direction from the last CCE to the first CCE) sequence. If performed in the forward direction, subsequently the terminal detects two PDCCH candidate locations in the forward direction sequence starting from a calculated start location. If performed in the reverse direction, subsequently the terminal detects two PDCCH candidate locations in the reverse direction sequence starting from a calculated start location.

In addition, blind detection may be configured to be performed in the forward direction sequence or in the reverse direction sequence starting from the middle. Alternatively, blind detection is configured to be performed in the forward direction sequence or in the reverse direction sequence starting from a specific PDCCH candidate location. For example, blind detection may be configured to be performed in the forward direction sequence starting from the third PDCCH candidate location. For example, if the quantity of times of blind detection performed at the aggregation level 1 is 2, blind detection is performed on the third and the fourth PDCCH candidate locations.

Similarly, for example, for the S-CC, a candidate control channel quantity factor set of the USS that needs to be detected may be configured as {0.66, 0.33, 1, 1} for the S-CC. Therefore, quantities of times of blind detection performed on the USS corresponding to the X-CC at aggregation levels are {0.66*6, 0.33*6, 1*2, 1*2} (namely, {4, 2, 2, 2}), respectively. A blind detection sequence or a blind detection location may be further configured (configured by using signaling or predefined).

(3) The search space parameter is used to represent detecting a specific search space, detecting a common search space, or detecting a specific search space and a common search space.

In an example, the search space parameter may have three values. The first value represents detecting a specific search space, namely, a USS, the second value represents detecting a CSS, and the third value represents detecting both a USS and a CSS.

Specifically, the base station may configure a search space parameter for each type of carrier or each carrier group. Subsequently the terminal may determine, based on the search space parameter, whether to detect the USS or the CSS.

Further, a search space parameter may be further configured for each aggregation level value, so as to determine whether to detect the USS or the CSS at an aggregation level.

(4) The DCI format that needs to be detected may be configured based on a carrier type or a carrier group.

For example, for the X-CC and the S-CC, a DCI format that needs to be detected may be separately configured for the X-CC and the S-CC.

(5) A CORESET (control resource set, namely, a time-frequency resource set that carries control information/a control channel/a search space) that may carry control information may be configured for each carrier type or each carrier group. Subsequently the terminal may perform blind detection on a PDCCH on a given CORESET.

Specifically, respective CORESETs may be configured for different carrier types or different carrier groups.

(6) The blind detection period indicates how often blind detection is performed.

In this embodiment of this application, a blind detection period may be separately configured for different carrier types or different carrier groups, so as to reduce the quantity of blind detection times. A unit of the blind detection period may be a transmission time unit such as one slot or an absolute time such as 1 ms.

Step 402 may be performed by the communications unit 2.

S403. The terminal receives the configuration signaling, and performs blind detection on the control channel based on the blind detection parameter.

Specifically, the terminal may perform, based on a carrier type or a carrier group to which a carrier allocated to the terminal belongs, blind detection by using a corresponding blind detection parameter.

For example, it is assumed that the terminal supports 10 carriers, carriers 1-3 are of a first type, carriers 4-7 are of a second type, and carriers 8-10 are of a third type. The base station sends configuration signaling for the first type and the second type to the terminal. For differentiation, a blind detection parameter corresponding to the first type is referred to as a blind detection parameter 1, and a blind detection parameter corresponding to the second type is referred to as a blind detection parameter 2. In this case, the terminal may perform, based on the blind detection parameter 1, blind detection on control channels carried by the carriers 1-3, and perform, based on the blind detection parameter 2, blind detection on control channels carried by the carriers 4-7.

It can be learned that in the solution provided in this embodiment of this application, the first device configures the blind detection parameter based on the carrier type or the carrier group, and for carriers of a same type or carriers of a same group, the second device performs blind detection on the control channel by using a same blind detection parameter. After DCI that includes scheduling information is detected, data may be received or sent based on the scheduling information in the DCI, so as to implement scheduling.

In addition, in the current system, a blind detection parameter is configured for each carrier, and a quantity of configuration signaling is equal to a quantity of carriers. However, in this embodiment of this application, one type of carrier or one group of carriers is corresponding to one piece of configuration signaling. This can reduce overheads of the configuration signaling.

FIG. 6 shows another example interaction procedure of another scheduling method. The interaction procedure may be applied to the foregoing application scenarios, for example, may be applied to the carrier aggregation scenario, the scenario in which a plurality of communications technologies coexist, or the dual connectivity scenario.

The interaction procedure includes the following steps.

S601. A base station separately configures a blind detection period for different carriers.

For example, a blind detection period 1 is configured for a carrier 1 (that is, the blind detection period 1 is configured for a control channel for scheduling data (for example, a PDSCH or a PUSCH, which may also be referred to as an NR-PDSCH or an NR-PUSCH in NR) of the carrier 1), and a blind detection period 2 is configured for a carrier 2 (that is, the blind detection period 2 is configured for a control channel for scheduling data (for example, a PDSCH or a PUSCH, which may also be referred to as an NR-PDSCH or an NR-PUSCH in NR) of the carrier 2).

In addition to the blind detection period, the base station may configure another blind detection parameter. For a configuration manner, refer to the descriptions in S401 and S402 in this specification, and details are not further described herein.

The following describes how the blind detection period is configured.

In an example, the blind detection period may be configured based on a transmission time unit used for a carrier.

In specific implementation, blind detection periods corresponding to different transmission time units may be predefined. For example, the blind detection periods corresponding to different transmission time units may be formulated in a protocol. Certainly, respective blind detection periods may be alternatively configured by the base station for different transmission time units based on an actual situation by using signaling.

As mentioned above, transmission time units used for aggregated carriers may be different. Therefore, the carriers may be classified based on the transmission time units. Examples are as follows:

A carrier of a first carrier type is a carrier with transmission time unit duration of L1;

a carrier of a second carrier type is a carrier with transmission time unit duration of L2;

a carrier of a third carrier type is a carrier with transmission time unit duration of L3; and

. . .

By analogy, details are not further described.

During blind detection period configuration, a blind detection period may be separately configured for different transmission time units. More specifically, a relatively long blind detection period may be configured for a relatively short transmission time unit duration, so as to reduce a quantity of blind detection times. For example, it is assumed that transmission time unit duration of the three types of carriers is L1, L2, and L3 in ascending order, duration of blind detection periods configured for the three types of carriers are T1, T2, and T3, respectively. For example, T1=m*L1, T2=n*L2, and T3=L3 may be configured.

In addition to the foregoing classification manner, the carriers may be alternatively classified into a carrier (a first-type carrier) for which a first transmission time unit is used and a carrier (a second-type carrier) for which a second transmission time unit is used. Duration of the second transmission time unit is greater than duration of the first transmission time unit.

In an implementation, a duration threshold may be set. A transmission time unit whose duration is greater than or equal to the duration threshold is the second transmission time unit, and a transmission time unit whose duration is less than the duration threshold is the first transmission time unit.

In another implementation, for a cross-carrier scheduling scenario, for example, a first carrier is used to carry a control channel for scheduling a second carrier; in the first carrier and the second carrier, a carrier with a shorter transmission time unit may be used as the first-type carrier, and the other carrier is used as the second-type carrier.

Correspondingly, configuring the blind detection periods may specifically include the following:

A. Configure a first blind detection period for the first-type carrier.

More specifically, duration of the first blind detection period is N times (N≥1) of the duration of the first transmission time unit. In this way, blind detection may be performed once in every N first transmission time units on a PDCCH corresponding to data of the first-type carrier, and blind detection does not need to be performed in each first transmission time unit on the PDCCH corresponding to the data of the first-type carrier. This reduces the quantity of blind detection times.

For example, for duration of a first transmission time unit less than 1 ms, blind detection may be performed once in every N first transmission time units on the PDCCH corresponding to the data of the first-type carrier. Further, N*first transmission time unit=1 ms may be designed.

B. Configure a second blind detection period for the second-type carrier.

More specifically, duration of the second blind detection period is M times (M is not less than 1) of duration of the first transmission time unit or the second transmission time unit. For example, for a transmission time unit with duration of 1 ms, blind detection may be performed once in every 1 ms on a control channel corresponding to data of the second-type carrier.

In an example, M<N may be set, to ensure that within a given time such as 1 ms, a sum of quantities of times of blind detection performed on carriers corresponding to different transmission time units does not increase excessively compared with that in an existing LTE technology.

It should be noted that the base station may configure the blind detection period at a user level. For example, the base station may configure a blind detection period for a terminal based on a carrier used by the terminal. Alternatively, the base station may configure a blind detection period at a carrier level. For example, the base station may use a total of N carriers, and may directly configure a blind detection period for each of the N carriers. Alternatively, the base station may classify the N carriers into a first-type carrier and a second-type carrier, and separately configures a blind detection period for the first-type carrier and the second-type carrier.

In another example, the blind detection period may be configured in the following manner: A blind detection period is separately configured for a USS and a CSS of a control channel. For example, a blind detection period P1 is configured for a USS of a control channel carried by a carrier 1, a blind detection period P2 is configured for a CSS of the control channel carried by the carrier 1, a blind detection period P3 is configured for a USS of a control channel carried by a carrier 2, and a blind detection period P4 is configured for a CSS of the control channel carried by the carrier 2.

In still another example, the base station may configure the blind detection period based on a subcarrier spacing, and separately configure a blind detection period for carriers with different subcarrier spacings.

In still another example, the base station may configure the blind detection period based on a transmission time unit, a USS, and a CSS. For example, a blind detection period P1 is configured for a USS of a control channel carried by a first carrier type (or a first-type carrier), a blind detection period P2 is configured for a CSS of the control channel carried by the first carrier type (or the first-type carrier), a blind detection period P3 is configured for a USS of a control channel carried by a second carrier type (or a second-type carrier), and a blind detection period P4 is configured for a CSS of the control channel carried by the second carrier type (or the second-type carrier). By analogy, details are not further described herein.

In still another example, the base station may configure the blind detection period based on a subcarrier spacing, a USS, and a CSS. For example, a blind detection period P1 is configured for a USS of a control channel carried by a carrier with a subcarrier spacing of 15 kHz (a first subcarrier spacing), a blind detection period P2 is configured for a CSS of the control channel carried by the carrier with the subcarrier spacing of 15 kHz (the first subcarrier spacing), a blind detection period P3 is configured for a USS of a control channel carried by a carrier with a subcarrier spacing of 30 kHz (a second subcarrier spacing), and a blind detection period P4 is configured for a CSS of the control channel carried by the carrier with the subcarrier spacing of 30 kHz (the second subcarrier spacing). By analogy, details are not further described herein.

Step 601 may be performed by the configuration unit 1.

S602. The base station sends configuration signaling that carries a blind detection parameter (which may include the blind detection period).

More specifically, the base station may use radio resource control (RRC) signaling, a master information block (MIB) message, a system information block (SIB) message, a radio media access control control element (MAC CE), or DCI as configuration signaling to carry the blind detection parameter. Alternatively, the base station may use a broadcast message as configuration signaling to carry the blind detection parameter, and in particular, a carrier-level blind detection parameter may be notified to each terminal by using the broadcast message.

Step 602 may be performed by the communications unit 2.

S603. The terminal receives the configuration signaling, and performs blind detection on the control channel based on the blind detection parameter.

By way of example rather than limitation, if the blind detection period is configured based on a transmission time unit, the terminal performs blind detection by using a corresponding blind detection period and based on a transmission time unit used for each carrier.

If the blind detection period is configured based on a USS and a CSS, the terminal performs blind detection on the USS by using a corresponding blind detection period, and performs blind detection on the CSS by using a blind detection period corresponding to the CSS.

If the blind detection period is configured based on a transmission time unit, a USS, and a CSS, the terminal performs blind detection based on the transmission time unit, the USS, and the CSS by using a corresponding blind detection period. If the foregoing example is used, the terminal performs blind detection on the USS of the first-type carrier by using the blind detection period P1, performs blind detection on the CSS of the first-type carrier by using the blind detection period P2, performs blind detection on the USS of the second-type carrier by using the blind detection period P3, and performs blind detection on the CSS of the second-type carrier by using the blind detection period P4.

If the blind detection period is configured based on a subcarrier spacing, a USS, and a CSS, the terminal performs blind detection based on the subcarrier spacing, the USS, and the CSS by using a corresponding blind detection period. If the foregoing example is used, the terminal performs blind detection on the USS of the carrier with the first subcarrier spacing by using the blind detection period P1, performs blind detection on the CSS of the carrier with the first subcarrier spacing by using the blind detection period P2, performs blind detection on the USS of the carrier with the second subcarrier spacing by using the blind detection period P3, and performs blind detection on the CSS of the carrier with the second subcarrier spacing by using the blind detection period P4.

It can be learned that in this embodiment of this application, the blind detection period can be flexibly configured based on at least one of the transmission time unit, the subcarrier spacing, the USS, and the CSS, thereby reducing the quantity of blind detection times.

FIG. 7 shows still another example interaction procedure of a scheduling method. The interaction procedure may be applied to a cross-carrier scheduling scenario.

Figure 8A:
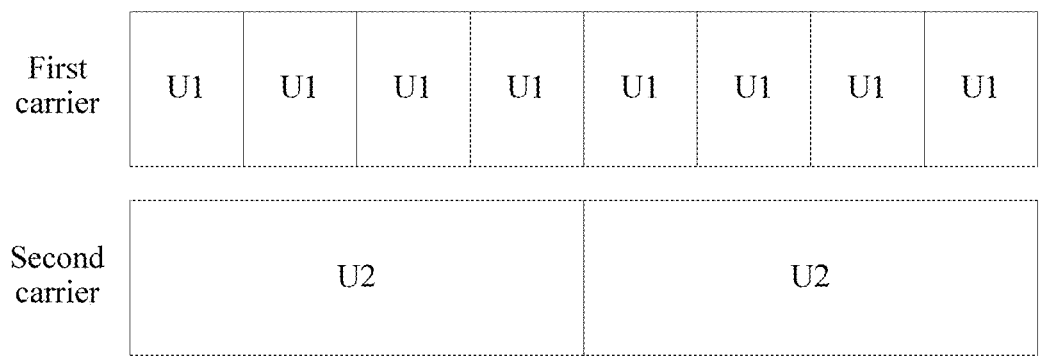
FIG. 8a is an example diagram of a comparison between a second transmission time unit and a first transmission time unit according to an embodiment of this application.
Figure 8B:
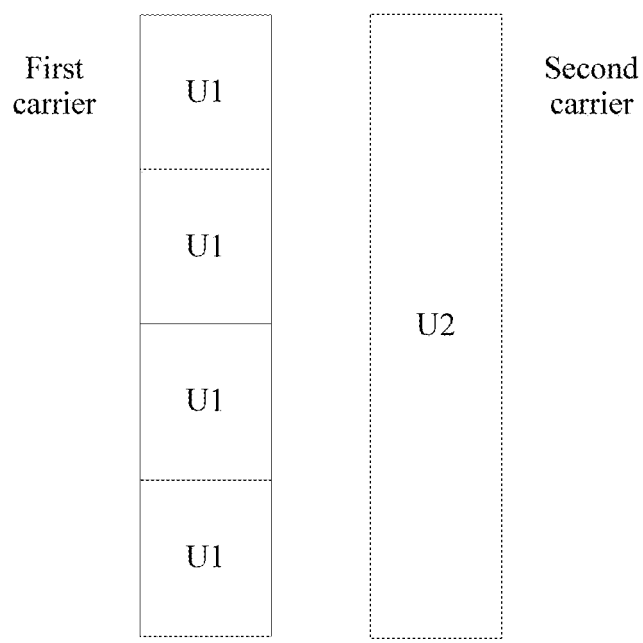
FIG. 8b is an example diagram of a comparison between a second subcarrier spacing and a first subcarrier spacing according to an embodiment of this application.

Referring to FIG. 8a and FIG. 8b, in this scenario, control information of a second carrier is transmitted by using a first carrier. A first transmission time unit or a first subcarrier spacing (U1 is used to represent the first transmission time unit or the first subcarrier spacing) is used for the first carrier, and a second transmission time unit or a second subcarrier spacing (U2 is used to represent the second transmission time unit or the second subcarrier spacing) is used for the second carrier. Duration of the second transmission time unit is M (M is not less than 2) times of duration of the first transmission time unit. In FIG. 8a, duration of the second transmission time unit is four times of duration of the first transmission time unit, and M consecutive U1s are aligned with one U2. In FIG. 8b, the second subcarrier spacing is four times of the first subcarrier spacing.

The interaction procedure includes the following steps.

S701. A base station transmits the control information of the second carrier in at least one target U1 in the M U1s.

The target U1 is a first transmission time unit that is in the M U1s and that is used to transmit the control information of the second carrier.

The first carrier may be used to transmit control information of one second carrier, or transmit control information of a plurality of second carriers.

In this scenario, it is unnecessary to carry control information of a same second carrier in each U1 corresponding to the first carrier (because within a same time, a quantity of short time units is greater than a quantity of long time units). Otherwise, a terminal needs to perform blind detection on the control information of the second carrier in each U1, and consequently blind detection overheads are high.

In an example, when the first carrier is used to transmit control information of one second carrier, the control information of the second carrier may be carried in some U1s corresponding to the first carrier. That is, the control information of the second carrier exists in some U1s of the M U1s, and subsequently the terminal needs to detect the control information of the second carrier only in these U1s.

Figure 9A:
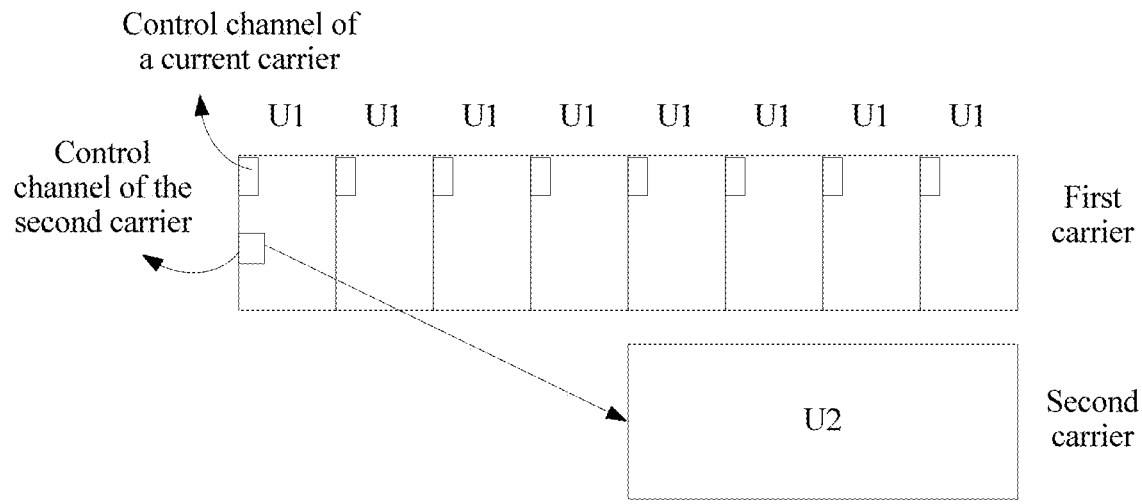
FIG. 9a is an example diagram of carrying a control channel in M U1s according to an embodiment of this application.

For example, referring to FIG. 9a, preferably, the control information of the second carrier and control information of a current carrier may be carried in the first U1 of the M U1s, and only the control information of the current carrier is carried in the remaining (M−1) U1s.

A U1 or U1s on which the control information of the second carrier is specifically carried may be predefined in a protocol or configured by using signaling. Signaling that can be used is described above (such as radio resource control (RRC) signaling, a master information block (MIB) message, a system information block (SIB) message, a radio media access control control element (MAC CE), or DCI).

In another example, when the first carrier is used to transmit control information of a plurality of second carriers, a correspondence may be established between an index of a U1 and a second carrier.

Optionally, in the M U1s, second carriers corresponding to any two U1s may be designed to be non-overlapped.

Figure 9B:
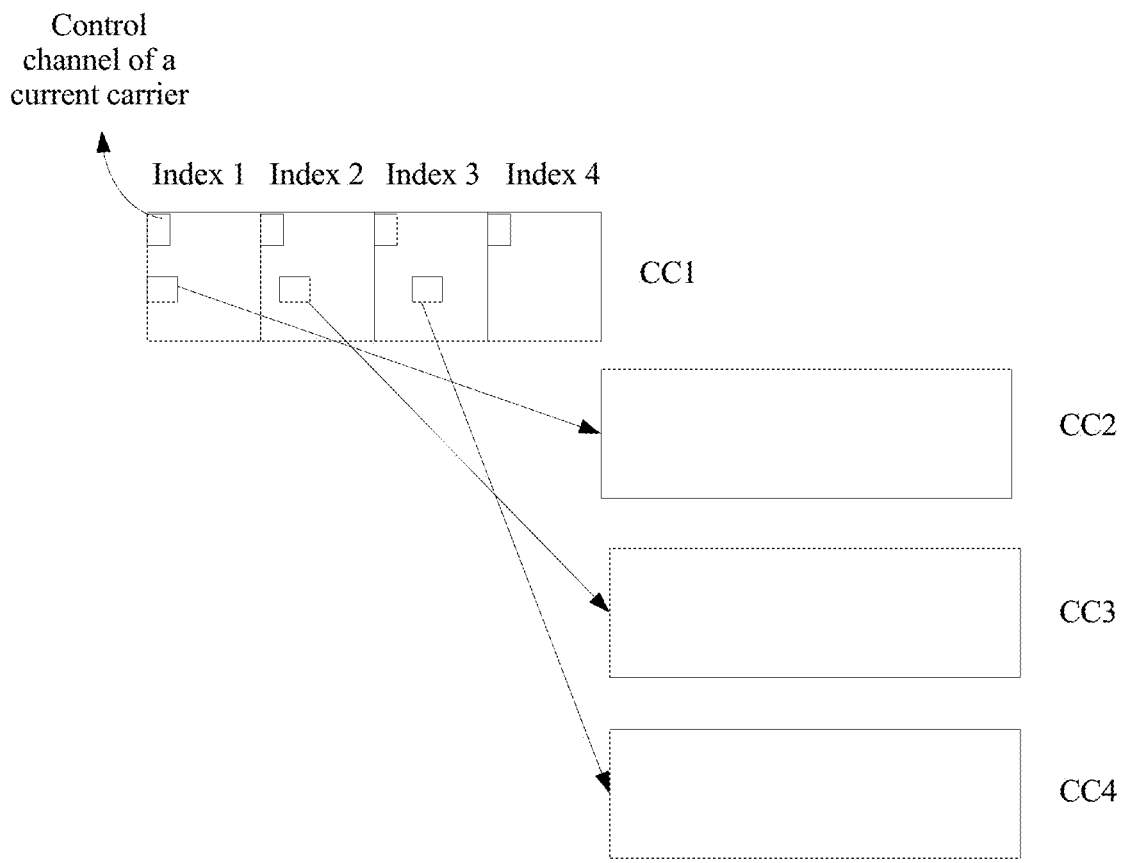
FIG. 9b and FIG. 9c are example diagrams of establishing a correspondence between an index of U1 in M U1s and a second carrier according to an embodiment of this application.

For example, referring to FIG. 9b, indexes of the M U1s are simply denoted as indexes 1-M, the first carrier is represented by CC1, and three second carriers are represented by CC2-CC4. In this case, correspondences may be established between the index 1 and the CC2, between the index 2 and the CC3, and between the index 3 and the CC4. Then, the first U1 may carry control information of the CC2, the second U1 may carry control information of the CC3, and the third U1 may carry control information of the CC4. This can prevent control information of all second carriers from being carried in one U1, thereby avoiding congestion.

Figure 9C:
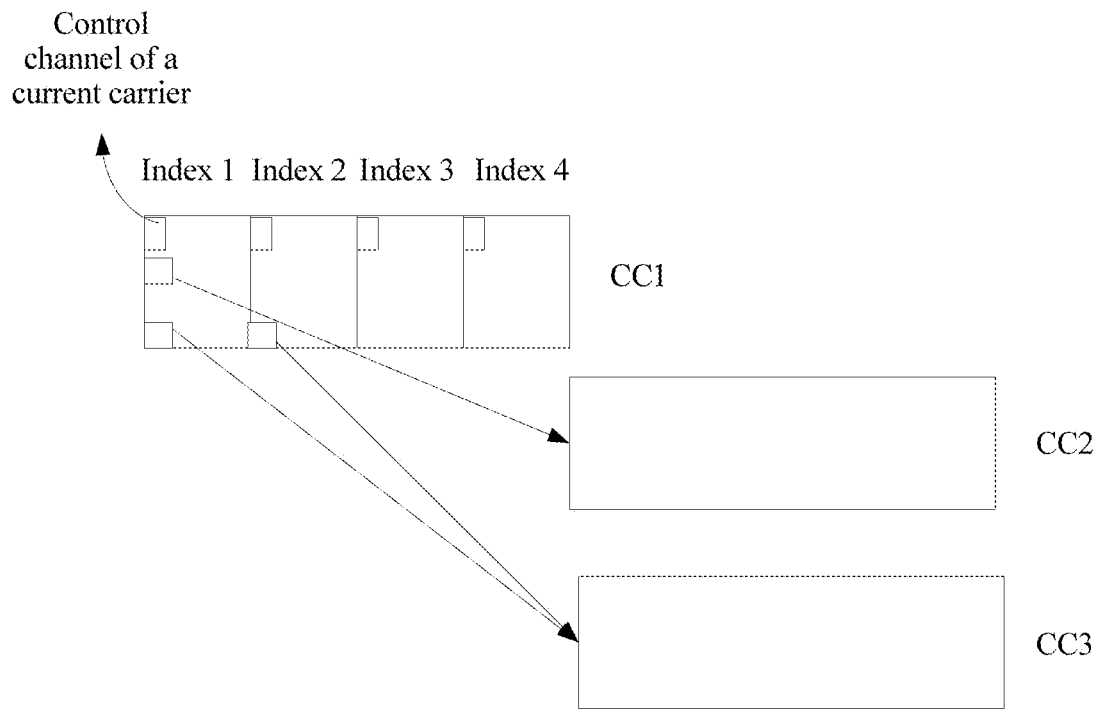

Certainly, second carriers corresponding to any two U1s may be alternatively designed to be partially overlapped. For example, if the foregoing example is used, referring to FIG. 9c, correspondences may be established between the index 1 and both of the CC2 and the CC3, and between the index 2 and the CC3. In this case, the second carriers corresponding to the two U1s are partially overlapped.

It should be noted that a correspondence between an index of a U1 and a second carrier may be predefined in a protocol, or the correspondence between an index of a U1 and a second carrier may be determined according to a rule or configured by using signaling. Signaling notification overheads can be reduced according to the predefined rule, and better flexibility and scalability can be provided in the signaling manner. Signaling that can be used is described above (such as radio resource control (RRC) signaling, a master information block (MIB) message, a system information block (SIB) message, a radio media access control control element (MAC CE), or DCI).

Step 701 may be performed by the communications unit 2.

S702. The terminal detects the control information in the target U1.

It can be learned that in this embodiment of this application, the control information of the second carrier is transmitted in at least one of the M U1s. In this way, scheduling information of the second carrier may not need to be blindly detected in each U1, thereby reducing a quantity of blind detection times.

It should be noted that this embodiment is applicable to a scenario "in which duration of the second transmission time unit is M (M is not less than 2) times of duration of the first transmission time unit", and is also applicable to a scenario without such a constraint. For example, this embodiment can also be applicable to a scenario "in which duration of the second transmission time unit is equal to duration of the first transmission time unit".

In addition, all the foregoing embodiments are applicable to a single-carrier scenario in addition to the cross-carrier scheduling scenario. In the single-carrier scenario, the "first carrier" may be replaced with "downlink", and the "second carrier" may be replaced with "uplink". In other words, when different transmission time units or different subcarrier spacings are used for an uplink and a downlink, uplink scheduling control information does not need to be included in each downlink transmission time unit.

Figure 10:
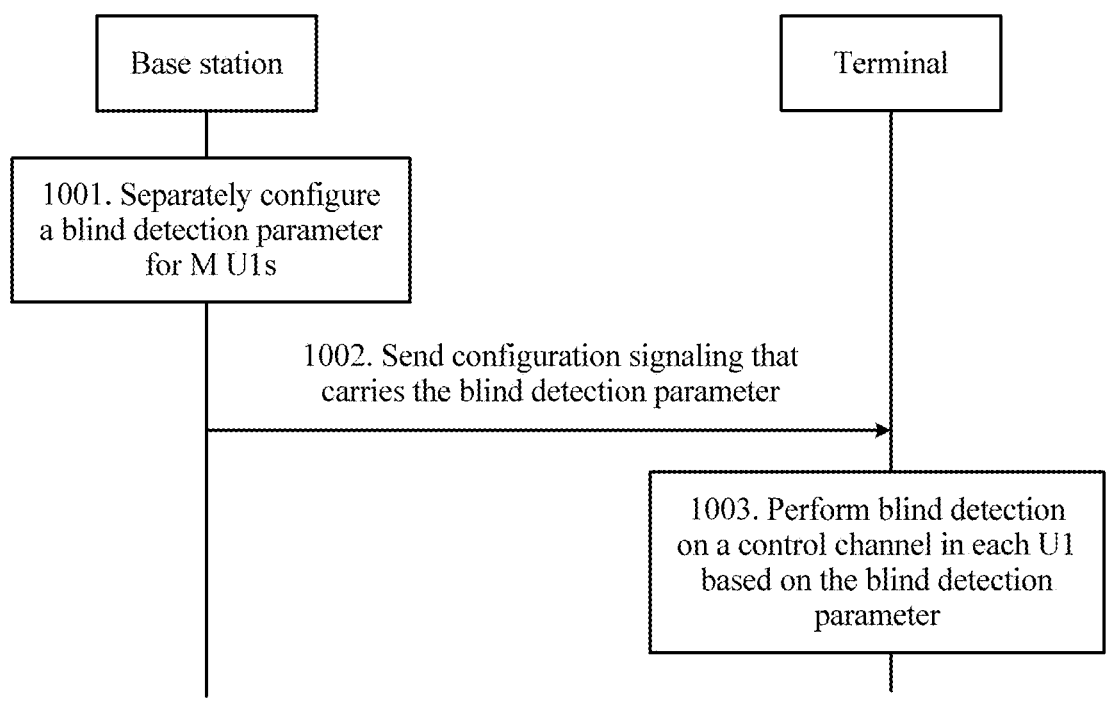

FIG. 10 shows still another example interaction procedure of a scheduling method. The interaction procedure may be applied to the cross-carrier scheduling scenario shown in FIG. 8a and FIG. 8b.

The interaction procedure includes the following steps.

S1001. A base station separately configures a blind detection parameter for M U1s.

In an example, blind detection parameters configured for different U1s are corresponding to a same blind detection candidate resource or different blind detection candidate resources.

For example, assuming that M=4 and that a quantity of candidate locations, at which blind detection needs to be performed, of a second carrier (represented by CC2) may be 44, 11 possible candidate locations may be configured for each of the four U1s. Certainly, quantities of candidate locations configured for the U1s may be alternatively different. For example, 12 possible candidate locations are configured for the first U1, 10 possible candidate locations are configured for the second U1, and the like. Details are not described herein. For example, 11 possible candidate locations are configured for each of the four U1s. When a terminal performs blind detection, for the first U1, the terminal does not detect all the 44 candidate locations, but needs to detect only 11 configured candidate locations. Similarly, for the second U1, the terminal does not need to detect all the 44 candidate locations, but needs to detect only 11 configured candidate locations. By analogy, details are not further described.

More specifically, blind detection candidate resources (candidate locations) may be configured for different U1s by configuring a candidate control channel quantity factor set or a control resource set.

Using the candidate control channel quantity factor set as an example, it is assumed that 11 possible candidate locations are configured for each of the four U1s. For example, candidate control channel quantity factors of all aggregation levels may be configured as 0.25. In addition, a blind detection sequence or a blind detection location may be further configured (refer to the description in S402).

For related descriptions of the candidate control channel quantity factor set and the control resource set, refer to the foregoing descriptions in this specification, and details are not further described herein.

In another example, control information or a control channel (of a carrier) that may be carried may be separately configured for different U1s.

For example, referring to FIG. 9a, it is assumed that M=4, control information of a current carrier and control information of a second carrier that may be carried may be configured for the first U1, and only the control information of the current carrier that may be carried is configured for the second U1 to the fourth U1.

It should be noted that the "may be carried" herein means that no DCI needs to be transmitted when no data is scheduled. In this case, the DCI is configured in the U1 but is not transmitted in the U1, and the configured DCI is transmitted in the U1 only when data is scheduled.

Step 1001 may be performed by the configuration unit 1.

S1002. The base station sends configuration signaling that carries the blind detection parameter.

S1002 is similar to S402, and details are not further described herein.

S1003. The terminal receives the configuration signaling, and performs blind detection on a control channel in each U1 based on the blind detection parameter.

Specifically, if the base station configures, based on the blind detection parameter, a same blind detection candidate resource or different blind detection candidate resources for different U1s, the terminal performs blind detection on the control channel on a blind detection candidate resource corresponding to each U1.

If the base station separately configures, for different U1s, control information or a control channel (of a carrier) that may be carried, the terminal detects, in each U1, the control information or the control channel that may be carried.

In another embodiment, the foregoing embodiment may also be understood as: A blind detection parameter is separately configured for different transmission time units. For example, a control channel with a second carrier is configured for a $1^{st}$ first-carrier time unit, and a control channel without a second carrier is configured for a $2^{nd}$ first-carrier time unit.

In another embodiment, the foregoing embodiment may be further understood as: The blind detection parameter is related to a location of a transmission time unit. For example, the first U1 is corresponding to a first CORESET and/or a first DCI set, and the second U1 is corresponding to a second CORESET and/or a second DCI set.

For example, the first DCI set may include scheduling DCI of a first carrier and scheduling DCI of the second carrier, and the second DCI set includes the scheduling DCI of the first carrier.

Flexible parameter configuration can be implemented by separately configuring the blind detection parameter for the U1s. For example, by separately configuring blind detection parameter, it is unnecessary to perform blind detection for a maximum of 44 times in each U1, thereby reducing a quantity of blind detection times.

FIG. 11 shows still another example interaction procedure of a scheduling method. The interaction procedure may be applied to the foregoing application scenarios, for example, may be applied to the single-carrier scenario (non-carrier aggregation scenario), the carrier aggregation scenario, the scenario in which a plurality of communications technologies coexist, or the dual connectivity scenario.

The interaction procedure includes at least the following steps.

S1101. A base station configures a blind detection parameter for a control channel based on a DCI format, or configures a DCI blind detection period based on a DCI format.

Specifically, a blind detection parameter may be separately configured for DCI formats.

The blind detection parameter may include at least one of an aggregation level set, a candidate control channel quantity factor set, a search space parameter, a control resource set (CORESET), and a blind detection period.

Using the blind detection period as an example below, a blind detection period may be separately configured for DCI formats. For example, a blind detection period 1 is configured for DCI 1, and a blind detection period 2 is configured for DCI 2. Configuration of another blind detection parameter is similar to that of the blind detection period, and reference may be made to the foregoing description. Details are not further described herein.

The DCI may have a DCI format for scheduling downlink data and a DCI format for scheduling uplink data, and the DCI format for scheduling the downlink data and the DCI format for scheduling the uplink data are different. Therefore, in an example, a blind detection parameter 1 (for example, a blind detection period P1) may be configured for the DCI format for scheduling uplink data (represented by a DCI format 1), and a blind detection parameter 2 (for example, a blind detection period P2) may be configured for the DCI format for scheduling downlink data (represented by a DCI format 2). In this way, if different subcarrier spacings or transmission time unit duration is used for an uplink and a downlink, uplink and downlink scheduling or uplink and downlink blind detection may be decoupled.

For a scenario in which different transmission time unit duration or different subcarrier spacings are used for an uplink and a downlink, more specifically, a relatively long blind detection period may be configured for a DCI format corresponding to a relatively short transmission time unit duration for scheduling, so as to reduce a quantity of blind detection times. For example, it is assumed that the DCI format 1 is used for scheduling uplink data, uplink transmission time unit duration corresponding to the DCI format 1 is L1, the DCI format 2 is used for scheduling downlink data, downlink transmission time unit duration corresponding to the DCI format 2 is L2, and L2 is less than L1. In this case, blind detection periods T1 and T2 may be separately configured for the DCI 1 and the DCI 2. For example, T2=m*L2, and T1=L1 or T1=n*L1 may be configured. Further, T1=T2 may be configured.

Figure 12:
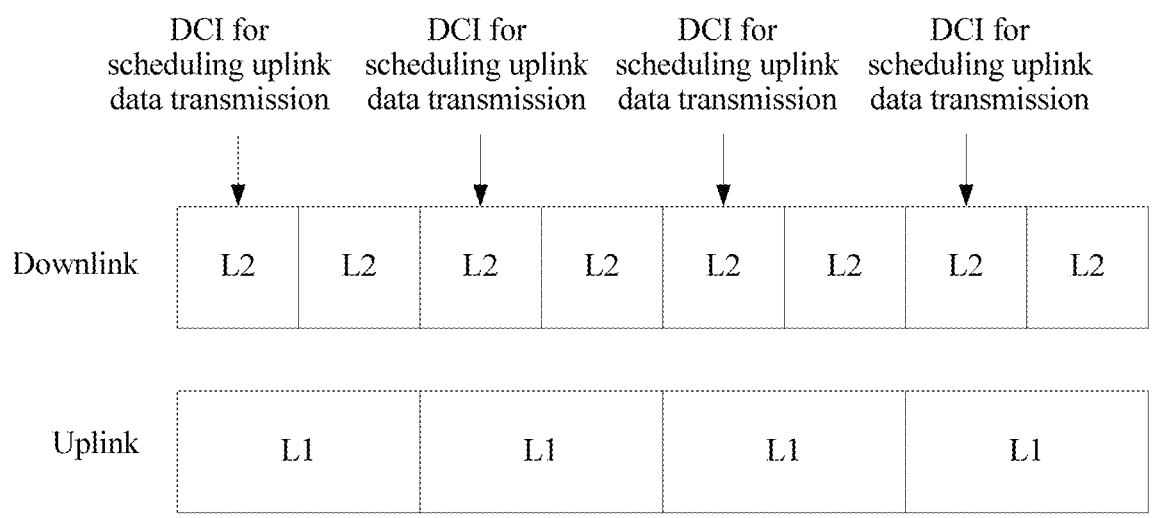
FIG. 12 is a schematic diagram of blind detection on a control channel in a downlink according to an embodiment of this application

If 2*L2 is equal to L1, referring to FIG. 12, DCI or a control channel for scheduling uplink data may be blindly detected in every other downlink transmission time unit.

In another example, a blind detection period may be separately configured for formats of DCI with different uses or functions. For example, in some scenarios (for example, during triggering of a random access procedure), the DCI may be used to carry common scheduling information, and in some other scenarios, the DCI may be used to schedule data transmission. Therefore, a blind detection period P1 may be configured for a format of the DCI for carrying common scheduling information, and a blind detection period P2 may be configured for a format of the DCI for scheduling data transmission. This mainly takes into account that the common scheduling information (such as DCI related to a random access procedure, DCI related to paging, or user group DCI that is used for power control, SRS switching, a slot format indication notification, or a URLLC preemption indication notification) is included not in all time units, and is only required in a particular time unit.

In still another example, a blind detection period may be separately configured for DCI with different scheduling subcarrier spacings. For example, a blind detection period P1 may be configured for DCI corresponding to a subcarrier spacing 1, a blind detection period P2 may be configured for DCI corresponding to a subcarrier spacing 2, and a blind detection period P3 may be configured for DCI corresponding to a subcarrier spacing 3. By analogy, details are not further described herein.

Another blind detection parameter may also be configured by using a configuration manner similar to that for the blind detection period.

It should be noted that, the DCI blind detection period can be understood as follows: The DCI is transmitted only when scheduling is required. However, a terminal does not know whether scheduling is required. Therefore, even if there is no DCI transmission, the terminal still needs to perform blind detection, and only after the blind detection is performed can the terminal know whether there is DCI.

For example, if the base station configures a DCI blind detection period W, the terminal performs blind detection on the DCI based on the period W. However, whether the DCI can be detected depends on whether the base station performs scheduling.

Step 1101 may be performed by the configuration unit 1.

S1102. The base station sends configuration signaling that carries the blind detection parameter, or the base station sends configuration signaling that carries the DCI blind detection period.

S1102 is similar to S402, and details are not further described herein.

S1103. The terminal receives the configuration signaling, and performs blind detection on the control channel based on the blind detection parameter corresponding to the DCI or the DCI blind detection period.

It should be noted that, in this application, the transmission time unit is a unit for data scheduling (PUSCH and PDSCH) or data transmission, and may be a subframe, a transmission time interval (one transmission time interval is equal to a sum of duration of several subframes, or a sum of several transmission time intervals is equal to duration of one subframe); or may be one time domain symbol, a plurality of time domain symbols, one slot, an aggregation of a plurality of slots, one mini-slot, an aggregation of a plurality of mini-slots, an aggregation of a mini-slot and a slot, or the like. The subcarrier spacing may be 15 kHz*$2^n$ (n is a positive integer), that is, the subcarrier spacing is 15 kHz, 30 kHz, or the like. Therefore, configuration solutions or descriptions related to a transmission time unit in all the foregoing embodiments may be replaced with configuration solutions or descriptions related to a subcarrier spacing.

The methods or algorithm steps described with reference to the content disclosed in this application may be implemented by using hardware, or may be implemented by a processor executing a software instruction. The software instruction may include a corresponding software module. The software module may be stored in a RAM memory, a flash memory, a ROM memory, an EPROM memory, an EEPROM memory, a register, a hard disk, a removable hard disk, a CD-ROM memory, or a storage medium in any other forms well-known in the art. A storage medium used as an example is coupled to the processor, so that the processor can read information from the storage medium, and can write information into the storage medium. Certainly, the storage medium may be alternatively a component of the processor. The processor and the storage medium may be located in an ASIC. In addition, the ASIC may be located in user equipment. Certainly, the processor and the storage medium may alternatively be located in the user equipment as discrete components.

A person skilled in the art should be aware that in one or more of the foregoing examples, the functions described in this application may be implemented by using hardware, software, firmware, or any combination thereof. When being implemented by using software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any usable medium accessible to a general-purpose or dedicated computer.

The objectives, technical solutions, and beneficial effects of this application are further described in detail in the foregoing specific implementations. It should be understood that the foregoing descriptions are merely specific implementations of this application, but are not intended to limit the protection scope of this application. Any modification, equivalent replacement, or improvement made based on the technical solutions of this application shall fall within the protection scope of this application.

What is claimed is:

1. A first device, comprising:
   a processor; and
   an interface; wherein the processor and the interface are coupled with each other, and wherein the processor executes program instructions to cause the first device to perform:
   separately configuring a blind detection period for different carriers, wherein the different carriers comprise a first-type carrier and a second-type carrier, wherein the first-type carrier uses a first transmission time unit, wherein the second-type carrier uses a second transmission time unit having a second duration different than a first duration of the first transmission time unit, wherein a duration of the blind detection period for the first-type carrier is assigned according to the first duration, wherein a duration of the blind detection period for the second-type carrier is assigned according to the second duration, and wherein the duration of the blind detection period for the first-type carrier is different from the duration of the blind detection period for the second-type carrier; and
   sending configuration signaling carrying a blind detection parameter, wherein a second device performs blind detection on a control channel according to the blind detection parameter, and the blind detection parameter comprises the blind detection period.

2. The first device according to claim 1, wherein the duration of the second transmission time unit is greater than duration of the first transmission time unit; and
   wherein configuring the respective blind detection period for each of the different carriers according to the respective transmission time unit corresponding to the respective one of the different carriers comprises:
   configuring a first blind detection period for the first-type carrier, wherein the duration of the first blind detection period is N times of the first duration, and wherein N≥1; and
   configuring a second blind detection period for the second-type carrier, wherein the duration of the second blind detection period is M times of the second duration, and wherein M≥1.

3. The first device according to claim 2, wherein M<N.

4. A method, comprising:
   configuring, by a first device, a first blind detection parameter of a first control channel according to a carrier type or a carrier group of the first control channel, wherein the configuring the first control channel comprises configuring a first blind detection period for a first carrier of the first control channel, wherein the first blind detection period is configured separately from configuration of a second blind detection period of a second carrier of a second control channel having a carrier type different from a carrier type of the first carrier, wherein the first carrier uses a first transmission time unit, wherein the second carrier uses a second transmission time unit having a second duration different than a first duration of the first transmission time unit, wherein a duration of the first blind detection period is assigned according to the first duration, wherein a duration of the second blind detection period is assigned according to the second duration, wherein a carrier type of the first carrier and the carrier type of the second carrier are each one of a first carrier type, a second carrier type, or a third carrier type, wherein a carrier of the first carrier type supports carrying a third control channel and a fourth control channel, wherein the third control channel is a control channel for scheduling data of a current carrier, and wherein the fourth control channel is a control channel for scheduling data of a carrier different than the current carrier, wherein a carrier of the second carrier type supports carrying the third control channel, and wherein a carrier of the third carrier type supports being scheduled by a carrier different than the current carrier; and
   sending, by the first device, configuration signaling carrying the first blind detection parameter.

5. The method according to claim 4, wherein a second device performs blind detection on the first control channel according to the first blind detection parameter.

6. The method according to claim 4, wherein configuring the blind detection parameter according to the carrier type comprises:
   separately configuring a first blind detection parameter for the carrier of the first carrier type and a second blind detection parameter for the carrier of the second carrier type.

7. The method according to claim 4, wherein the control channel is a downlink control channel.

8. The method according to claim 4, wherein the blind detection parameter further comprises an aggregation level set, a candidate control channel quantity factor set, a search space parameter, a downlink control information (DCI) format, or a control resource set, and wherein the aggregation level set comprises an aggregation level value, and wherein the candidate control channel quantity factor set comprises a candidate control channel quantity factor corresponding to an aggregation level value; and wherein the search space parameter represents detecting a specific search space, detecting a common search space, or detecting a specific search space and a common search space.

9. A first device, comprising:
a processor; and
an interface, wherein the processor and the interface are coupled with each other;
wherein the processor executes program instructions to cause the first device to perform:
configuring a first blind detection parameter of a first control channel according to a carrier type or a carrier group of the first control channel, wherein the configuring the first control channel comprises configuring a first blind detection period for a first carrier of the first control channel, wherein the first blind detection period is configured separately from configuration of a second blind detection period of a second carrier of a second control channel having a carrier type different from a carrier type of the first carrier, wherein the first carrier uses a first transmission time unit, wherein the second carrier uses a second transmission time unit having a second duration different than a first duration of the first transmission time unit, wherein a duration of the first blind detection period is assigned according to the first duration, wherein a duration of the second blind detection period is assigned according to the second duration; wherein the carrier type of the first carrier and the carrier type of the second carrier are each one of comprises a first carrier type, a second carrier type, or a third carrier type, wherein a carrier of the first carrier type supports carrying a third control channel and a fourth control channel, the third control channel is a control channel for scheduling data of a current carrier, and the fourth control channel is a control channel for scheduling data of a carrier different than the current carrier, wherein a carrier of the second carrier type supports carrying the third control channel, and wherein a carrier of the third carrier type supports being scheduled by a carrier different than the current carrier; and
sending configuration signaling carrying the first blind detection parameter.

10. The first device according to claim 9, wherein a second device performs blind detection on the first control channel according to the first blind detection parameter.

11. The first device according to claim 9, wherein configuring the blind detection parameter according to the carrier type, comprises:
separately configuring a first blind detection parameter for the carrier of the first carrier type and a second blind detection parameter for the carrier of the second carrier type.

12. The first device according to claim 9, wherein the control channel is a downlink control channel.

13. The first device according to claim 9, wherein the blind detection parameter further comprises an aggregation level set, a candidate control channel quantity factor set, a search space parameter, a downlink control information (DCI) format, or a control resource set, wherein the aggregation level set comprises an aggregation level value, and wherein the candidate control channel quantity factor set comprises a candidate control channel quantity factor corresponding to an aggregation level value; and
wherein the search space parameter represents detecting a specific search space, detecting a common search space, or detecting a specific search space and a common search space.

14. The device according to claim 1, wherein a carrier type of the first-type carrier and the carrier type of the second-type carrier are each one of a first carrier type, a second carrier type, or a third carrier type;
wherein a carrier of the first carrier type supports carrying a third control channel and a fourth control channel, wherein the third control channel is a control channel for scheduling data of a current carrier, and wherein the fourth control channel is a control channel for scheduling data of a carrier different than the current carrier;
wherein a carrier of the second carrier type supports carrying the third control channel; and
wherein a carrier of the third carrier type supports being scheduled by a carrier different than the current carrier.

15. The method according to claim 4, wherein the duration of the blind detection period for the first carrier is different from the duration of the blind detection period for the second carrier.

16. The method according to claim 4, wherein the duration of the second transmission time unit is greater than duration of the first transmission time unit.

17. The method according to claim 4, wherein the duration of the first blind detection period is N times of the first duration, and wherein N≥1; and
wherein the duration of the second blind detection period is M times of the second duration, and wherein M≥1.

18. The first device according to claim 9, wherein the duration of the blind detection period for the first carrier is different from the duration of the blind detection period for the second carrier.

19. The first device according to claim 9, wherein the duration of the second transmission time unit is greater than duration of the first transmission time unit.

20. The first device according to claim 9, wherein the duration of the first blind detection period is N times of the first duration, and wherein N≥1; and
wherein the duration of the second blind detection period is M times of the second duration, and wherein M≥1.

* * * * *